(12) United States Patent
McKenzie

(10) Patent No.: US 9,280,798 B2
(45) Date of Patent: Mar. 8, 2016

(54) METHOD AND SYSTEM FOR FACILITATING THE REVIEW OF ELECTRONIC DOCUMENTS

(76) Inventor: Gregory Dominic McKenzie, Kingsgrove (AU)

( * ) Notice: Subject to any disclaimer, the term of this patent is extended or adjusted under 35 U.S.C. 154(b) by 956 days.

(21) Appl. No.: 12/753,160

(22) Filed: Apr. 2, 2010

(65) Prior Publication Data

US 2010/0325584 A1  Dec. 23, 2010

Related U.S. Application Data

(60) Provisional application No. 61/166,158, filed on Apr. 2, 2009.

(51) Int. Cl.
*G06F 3/048* (2013.01)
*G06Q 50/18* (2012.01)
*G06Q 30/02* (2012.01)

(52) U.S. Cl.
CPC ............ *G06Q 50/18* (2013.01); *G06F 2216/11* (2013.01); *G06Q 30/0282* (2013.01)

(58) Field of Classification Search
CPC . G06Q 30/0282; G06F 2216/11; G06F 17/30; G06F 17/60; G06F 3/048
USPC ........................................................ 715/835
See application file for complete search history.

(56) References Cited

U.S. PATENT DOCUMENTS

| | | | | |
|---|---|---|---|---|
| 5,706,452 A | * | 1/1998 | Ivanov .......................... | 715/751 |
| 7,007,232 B1 | * | 2/2006 | Ross et al. .................... | 715/208 |
| 7,539,938 B2 | * | 5/2009 | Ross et al. .................... | 715/255 |
| 7,716,060 B2 | * | 5/2010 | Germeraad ............ | G06Q 10/10 702/1 |
| 7,966,328 B2 | * | 6/2011 | Germeraad ............ | G06Q 10/10 707/737 |
| 2004/0153456 A1 | * | 8/2004 | Charnock et al. ............... | 707/10 |
| 2006/0106847 A1 | * | 5/2006 | Eckardt et al. ................ | 707/101 |
| 2006/0116994 A1 | * | 6/2006 | Jonker et al. ...................... | 707/3 |
| 2007/0220426 A1 | * | 9/2007 | Mueller et al. ................ | 715/532 |
| 2008/0163118 A1 | * | 7/2008 | Wolf ............................. | 715/835 |
| 2009/0235196 A1 | * | 9/2009 | MacBeth et al. .............. | 715/780 |
| 2011/0113348 A1 | * | 5/2011 | Twiss et al. .................... | 715/753 |
| 2011/0145164 A1 | * | 6/2011 | Lavoie .................. | G06Q 40/06 705/36 R |

FOREIGN PATENT DOCUMENTS

WO   WO 2007147194 A1 * 12/2007

OTHER PUBLICATIONS

Sergi Minguez & Juan C. Dursteler, "Visual Search Engines," published on Jun. 1, 2009, www.infovis.net, Issue No. 198, pp. 1-8.*
Robin Good, "Personal Knowledge Mapping Tool," published on Oct. 31, 2002, www.masternewmedia.org, pp. 1-5.*

* cited by examiner

*Primary Examiner* — Dino Kujundzic
(74) *Attorney, Agent, or Firm* — Edell, Shapiro & Finnan LLC

(57) ABSTRACT

A method and system is provided for facilitating the review of electronic documents such as patent, trademark and design documents. Example embodiments of methods provide a business context for performing the review, a role within the business context together with the event that is the reason for the review to be requested.

17 Claims, 28 Drawing Sheets

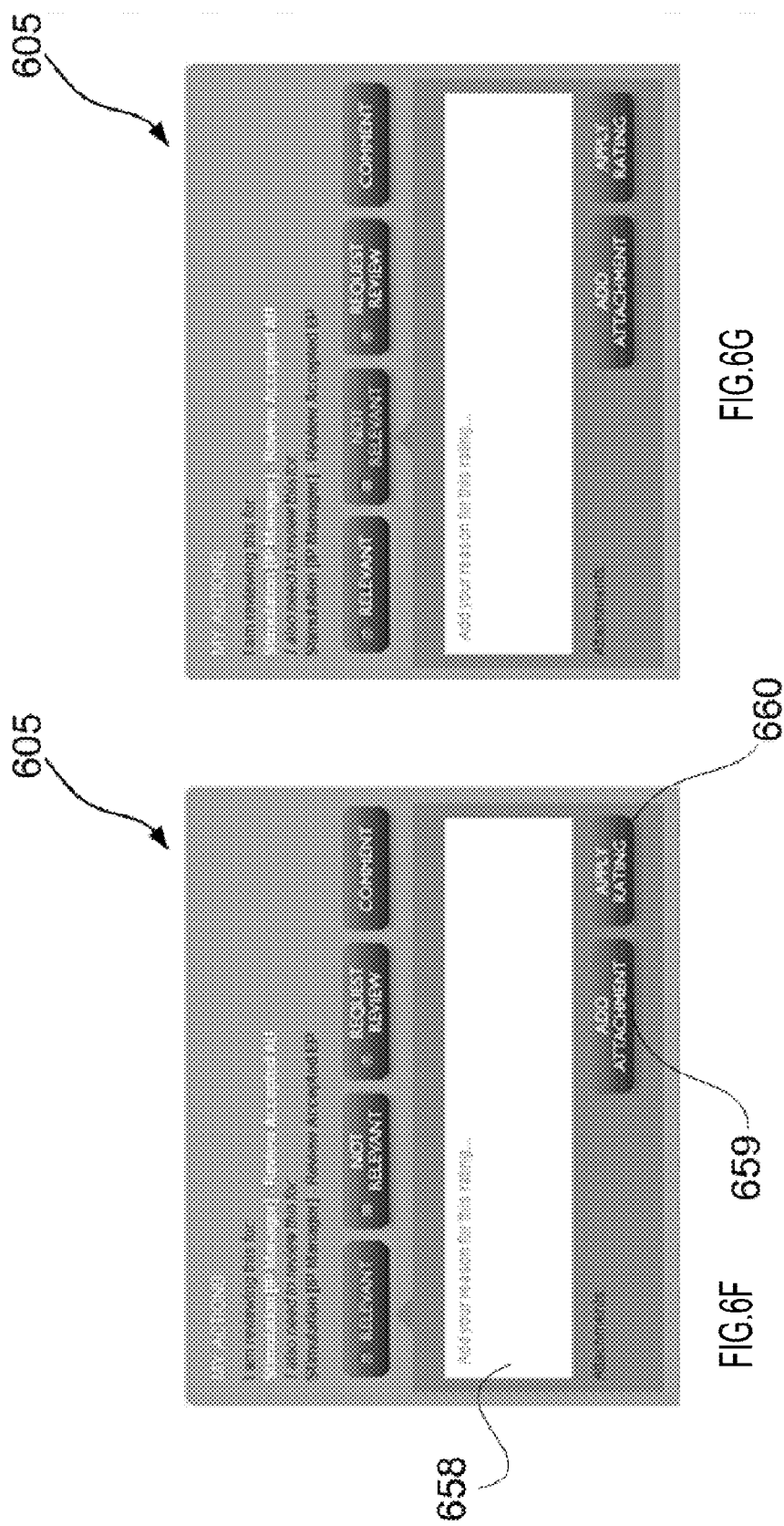

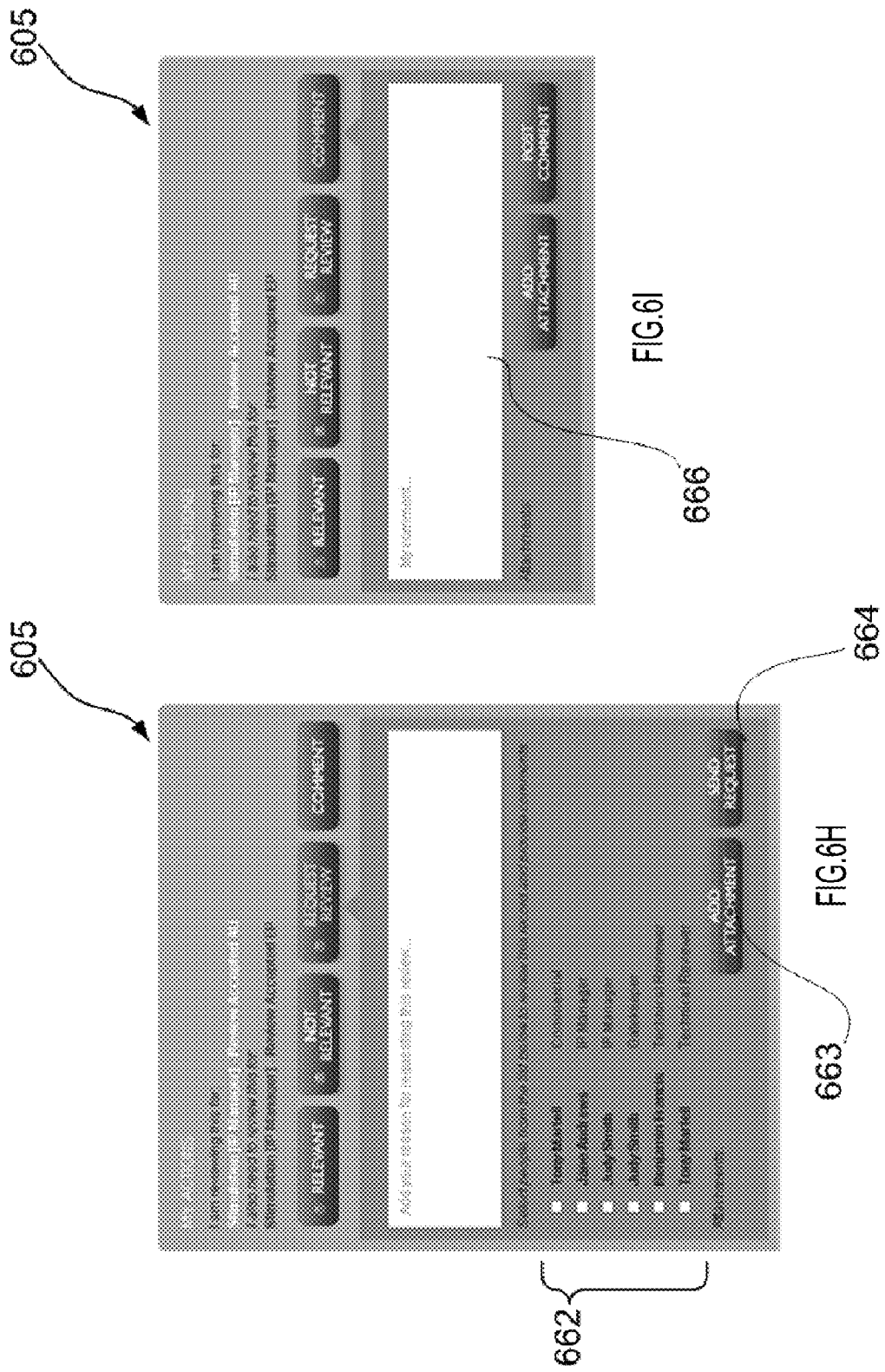

METHOD AND SYSTEM FOR FACILITATING THE REVIEW OF ELECTRONIC DOCUMENTS

CROSS REFERENCE TO RELATED APPLICATION

This application claims priority from U.S. Provisional Patent Application Ser. No. 61/166,158, filed Apr. 2, 2009, the disclosure of which is incorporated herein by reference in its entirety.

TECHNICAL FIELD

The invention concerns facilitating the review of electronic documents, for example but not limited to, facilitating an ordered and thorough review of patent literature that is located during searching. Aspects of the invention include a methods, computer systems and software for facilitating the review of electronic documents.

BACKGROUND

Many organisations conduct regular searches of patent and academic literature. The main motivations for conducting these searches is to watch the activities of their competitors and to better assess the strength of their own intellectual property. Some services exist that allow searches to be configured and updates automatically delivered vi email. At regular intervals each search produces a number of new documents that must be reviewed. Often multiple people from the organisation are responsible for reviewing a new document.

Systems exist to provide reviewers with the ability to access these documents and provide an indication of their review using a set of interfaces. However, as the number of searches, people and documents increase the ability to help ensure that the reviews are conducted in an ordered manner and is performed thoroughly becomes increasingly difficult.

SUMMARY OF THE INVENTION

In one aspect the invention provides a computer implemented method for facilitating review of an electronic document, the method comprising the steps of:
  (a) providing for display on a user interface information relating to the electronic document and information relating to a particular context that the electronic document is to be reviewed by a user;
  (b) enabling the user to enter into the user interface an indication of their review of the electronic document for the particular context; and
  (c) providing for display on the user interface information relating to an another context that the electronic document is to be reviewed or has been reviewed.

It is an advantage of the invention that the user is notified on the interface that the electronic document relates to more than one context. This will help to minimise any duplication of the user's effort by helping to avoid the user from reconsidering the electronic document.

The electronic document is any document that can be rendered on a display. For example, the electronic document may be a patent record or specification, trade mark record or specification, design record or specification, technical disclosure, defensive publication, conference publication, assignment record, academic paper, journal article, business article, news story, blog entry, annual report, book, dissertation, or other similar document.

Providing the information relating to the electronic document of step (a) may comprise bibliographic information relating to the electronic document. It may also comprise part or all of the document. Part of the document could include one or more representative images.

Step (a) may comprise providing information relating to the review of the electronic document entered by other users for the particular context. The user has a role within the particular context, and the method may further comprise selectively providing information relating to reviews by other users based on whether the role of the user allows providing the information relating to the review by other users. The other users may each have a role within the particular context and the step of selectively providing information relating to the review of other users may also be based upon the role of the other users relative to the user.

It is an advantage of selectively providing information relating to reviews that dissemination of information can be controlled. This is particularly relevant where contractors or other service providers have access to the computer implemented method and dissemination of information could impact on retention of legal privilege or compliance with stock market disclosure requirements. For example, commercially relevant discussions by commercial review in relation to a particular context would be masked from the technical reviewers.

Step (a) may comprise providing information describing the particular context, such as a reference name or title. Step (a) may comprise providing for display information relating to the role of the user within the particular context. For example, the particular context could be a combination of a business context for performing the review, a role within the business context that the user is performing the review, and an event that triggered the review to be requested in which the review is being made.

The indication of their review of step (b) may comprise any one or more of:
  a text based comment;
  a rating selected from a list of ratings;
  a request for another user to review the document; or
  an attachment.

The selection of a rating from a list of ratings and committing of the review may also trigger one or more review requests depending on the rating selected.

Step (c) may comprise providing information describing the alternative context, such as one or more of a business context for performing the alternative context review, a role within the business context that the user is performing the alternative context review, and an event that triggered the review to be requested in which the alternative context review is being made.

The information relating to the another context that the electronic document is to be reviewed or has been reviewed of step (c) may be by the particular user and/or alternative users.

The method may further comprise the steps of:
  (d) receiving an indication of the review of the user of the electronic document in the particular context; and
  (e) enabling the user to enter into the user interface an indication of their review of the electronic document in the another context.

In another aspect the invention provides a computer-implemented method for facilitating review of electronic documents, the method comprising the steps of:
  (a) providing for display on a user interface information relating to a role of the user in reviewing the electronic documents;

(b) enabling the user to enter into the user interface an indication that the role is to be performed by an alternative reviewer, and
   a first time period that the role is to be performed by the alternative user; and
(c) during the first period of time, allowing access to the electronic documents to the alternative user for review.

It is an advantage of the invention that the user is able to delegate their role to an alternative user when they are unable to perform the role so that reviewing of the electronic documents can continue.

The method may further comprise:
providing for display on a user interface information relating to a role of the alternative user in reviewing the electronic documents;
enabling the alternative user to enter into the user interface an indication that the role is to be performed by a further alternative reviewer, and
   a second time period that the role is to be performed by the further alternative user; and
during the second period of time, allowing access to the electronic documents to the further alternative user for review.

The method may further comprise the step of:
enabling the user to enter into the user interface an indication that the role is no longer to be performed by the alternative user; and
now disallowing access to the electronic documents by the alternative user, and any users that the alternative user has indicated are to perform the role of the alternative user (i.e. the further alternative user).

The role may be all the roles of the user or at least one of the roles of the user.

The role may be a specific type of role in a particular context for the review of the electronic documents. The information relating to a role of the user in reviewing the electronic documents may include the name of the particular context of the review.

Before step (c) the method may further comprise only performing step (c) if it is allowable that the alternative user perform the role of the user. Alternatively, step (b) may further comprise the step of only providing a list of the alternative users that are allowed to perform the role of the user, and step (c) further comprises enabling the user to select from the list.

Whether it is allowable that the alternative user perform the role of the user may also depend on the role of the alternate user. Further it may depend on the role of the user and the alternate user within the particular context.

The alternative user may be a group of users.

In yet another aspect the invention provides a computer implemented method for facilitating review of electronic documents related to one or more contexts, the method comprising the steps of:
(a) providing for display on a user interface information relating to an electronic document that is related to a particular context;
(b) enabling a user to enter into the user interface an indication of their review of the electronic document; and
(c) enabling the user to enter into the interface a request for the user to receive a notification when a specific event occurs that is associated with the electronic document or any of the electronic documents of the particular context.

The electronic document may be related to a patent property and the event associated with the patent property may be any one or more of:
national phase entry;
acceptance;
examination commencing;
lapsing;
filing of a related continuation application,
filing of opposition,
filing of request for certification,
filing of request for re-examination
payment of renewal, and
recording of an assignment.

The electronic document may also be related to other intellectual property rights such as a trade mark or design property. The event would then be one or more of the events associated with the filing, prosecution, maintenance and enforcement of trade marks or designs.

The event may relate to one or more jurisdictions.

The user may have a role type, and the request of step (c) may be for all users having a particular role type to receive the notification.

The method may further comprise the step of:
(d) when the specific event does occur, providing for display on the user interface an indication that the event has occurred.

The method may further comprise the step of:
(e) providing for display on the user interface a summary of the events that have already occurred.

The user interface of step (a), (b) and (c) may be the same instance of the user interface, such as a single webpage.

In yet a further the invention provides a computer system for facilitating the review of electronic documents, the system comprising:
(a) a first data store on a provider network to store (i) one or more electronic documents, and (ii) one or more document event records that initiate a workflow on a customer network remote from the provider network;
(b) a second data store located on the customer network from the first datastore to store workflow information relating to the review of the documents;
(c) a user interface application hosted on the customer network to receive and display the first data and the second data;
(d) a polling service located on the customer network that polls the first data store to initiate the work flow;
(e) a document retrieval service located on the provider network that periodically retrieves the one or more electronic documents that satisfy one or more retrieval criteria;
(f) an event trigger service located on the provider network that applies one or more event trigger criteria against documents retrieved by the document retrieval service and creates document event records for each of the one or more electronic documents that satisfies the event trigger creation criteria.

It is an advantage of the system that the provider network can be isolated from the customer network such that the customer network can interrogate the first document store on the provider network, but the provider network cannot interrogate the second document store on the customer network.

From the perspective of a customer, the system provides the advantage that (i) the provider does not have access to information relating to the review of the documents that is potentially confidential information; (ii) additional workflows that are created as child workflows of workflows created by the retrieved document event records cannot be detected by the service provider.

From the perspective of a service provider, the system also provides the advantage that (i) information on a first instance of a customer network could not be passed to a second instance of a customer network as the information can not be retrieved from the customer networks; and (ii) the provider does not have access to customer's confidential information that could potentially conflict them from providing a service to other customers.

From the perspective of both the provider and customer, the system enables only the workflow information relating to the review of the documents to be stored on the customer network and electronic documents to be stored with the service provider and the electronic documents provided on demand to customer. This provides the advantages of (i) decreasing the requirement for duplication of electronic document backup by both the provider and customer; (ii) decreasing the requirement for high availability storage capacity or retrieval systems for electronic documents on the client network, and (iii) decreasing data transfers as only documents requested by users of the customer are downloaded.

The user interface application being hosted on the customer network has the advantage from the customer perspective that interface response times on a local server will be quicker as the traffic only needs to traverse the local area network of the customer. From the perspective of the provider, it provides the advantage that more customers can be serviced by provider network infrastructure as the interface application is consuming processing power and bandwidth resources on the customer network and thereby decreases processing power and bandwidth resources on the provider network.

In a further aspect the invention provides a computer implemented method for facilitating the review of electronic documents, the method comprising the steps of:
(a) making available for display on a user interface information relating to the electronic documents for review by a user;
(b) enabling the user to enter into the user interface an indication of their review of the electronic documents; and
(c) providing for display on the user interface information summarising the reviews entered by the user of the electronic documents.

The information summarising the reviews of the user may be any one or more of:
number of electronic documents reviewed;
average time between step (a) and the user entering their indication of their review;
number of reviews within a determined period of time; and
number of electronic documents yet to be reviewed.

The user may be two or more users and the information summarising the reviews may summarise the reviews of the two or more users. Each user may have one of a plurality of role types and the information summarising the reviews may be grouped by roles.

A review may occur in a particular context, and each electronic document may have one or more contexts. The information summarising the reviews may be grouped by context.

In a further aspect the invention provides a computer implemented method for facilitating the review intellectual property activity of competitors, the method comprising the steps of:
(a) providing for display on a user interface a schematic representation of the competitors, where each competitor is represented by an icon proportionately sized to represent the number of intellectual property filings by the respective competitor.
A colour of each icon may represent one or more of:
recent intellectual property related activity by that competitor;

the lack of recent intellectual property activity by that competitor
a rating has been applied to a patent or patent application of the competitor that would indicate the patent or patent application is relevant; and
an event has occurred on a intellectual property record of the competitor that the user has previously requested notification on.

The schematic representation may relate to the intellectual property activity of competitors in a particular technology context.

The method may further comprise:
(b) enabling the user to select an icon of a competitor; and
(c) providing for display on the user interface information summarizing the intellectual property activity of that competitor. The information summarising the intellectual property activity of that competitor may include anyone or more of:
the name of the competitor,
country of origin of the competitor,
the competitor's own competitors,
description of the competitor and/or its activities,
statistics on patent applications lodged for the competitor, and
statistics on events on the patent applications owned by the competitor.

The method may further comprise:
(d) providing one or more links on the summary of the intellectual property activity of that competitor for the user to navigate to the intellectual property record or intellectual property applications of the competitor or a subset of the intellectual property or intellectual property applications such as (i) those with a particular rating, (ii) those that have had an event, for example being filed or published, occur, or (iii) those that have had a particular event occur in a selected time period.

The computer implemented method for facilitating the review intellectual property activity of competitors can be used to monitor any one or more of a patent record; a patent application, trade mark record, a trade mark application, a design record or a design application. A record for a patent, trade mark or design can represent either an intellectual property publication, an intellectual property application or a intellectual property family.

BRIEF DESCRIPTION OF THE DRAWINGS

An example of the invention will now be described with reference to the accompanying drawings, in which:
FIGS. 5A, 5B and 5C are sample screen shots of the interfaces that allow a user and to browse and search through the documents that the user must enter their review for;
FIG. 5D is a screen shot of an expanded drop down box used on the screens of FIGS. 5A, 5B and 5C to change between inbox view modes.

FIGS. 6E, 6F, 6G, 6H, 6I and 6J are sample screen shots of the interfaces that allow a user to enter an indication of their review of the document;

DETAILED DESCRIPTION

Figure 1:
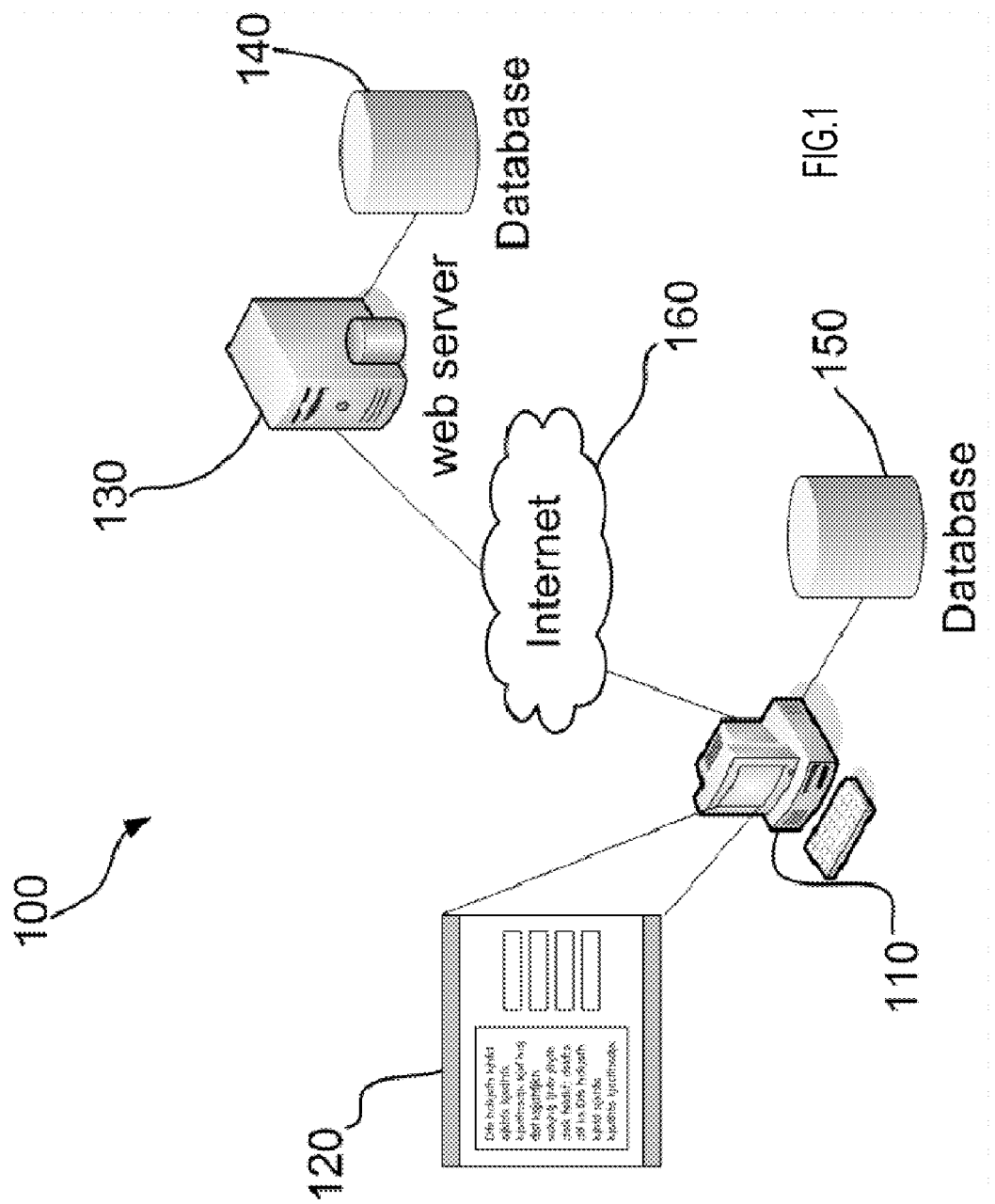
FIG. 1 is a schematic representation of a computer system for implementing an example of the invention.

Referring now to FIG. 1, there is shown a system 100 for facilitating review of electronic documents, which in this example are published patent and patent application specifications.

The system 100 comprises of a client user terminal 110 that is able to display a graphic user interface 120, and a database 150 in communication with the user terminal 110. It should be understood that multiple user terminal 110 are part of the system of the example but only one is shown here for ease of reference. The multiple user terminals 110 can be connected to each other using local area communications networks (not shown).

The system 100 also comprises a web server 130 and database 140 in communication with the web server 130. The user terminal 110 and the web server 130 are interconnected by means of the internet 160 or any other suitable communications network.

In this example the user interface 120 is displayed using a web browser software application, such as Internet Explorer™. The interface 120 is dynamic as it displays information provided by the webserver 130 which controls the content and functionalities available on the interface 120. The interface 120 can also receive information from the database 150. The user is able to use the user terminal 110 to enter input which may then be stored on either database 140 or database 150. The various types information provided for display on the user interface, the various functionalities of the interface and the various types of input that can be entered by the user into the interface 120 is described in further detail below.

Figure 2:
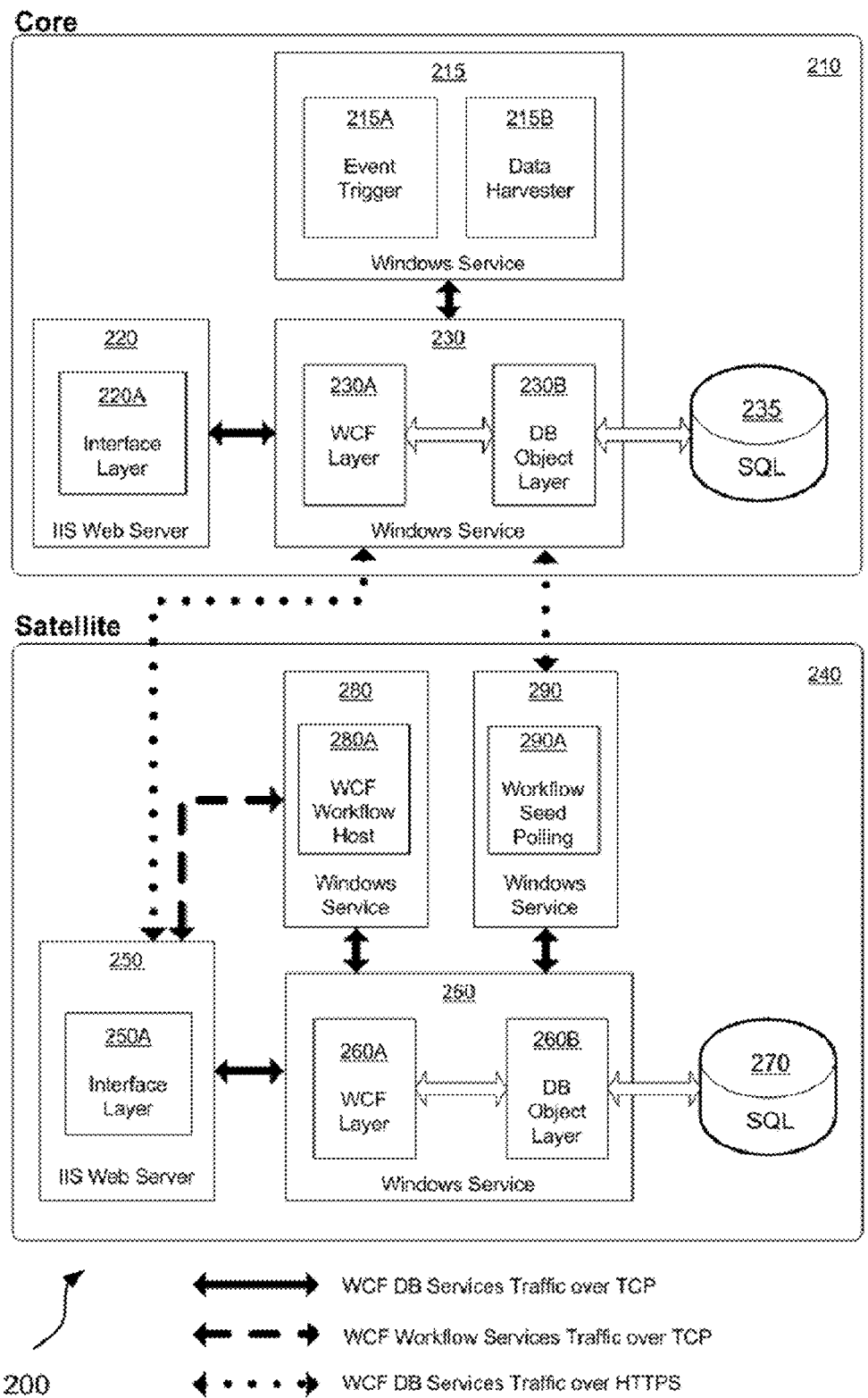
FIG. 2 is a schematic representation of the component applications and services for implementing an example of the invention.

Referring now to FIG. 2, there is shown system 200 consisting of the component applications and services for implementing an example of the invention. These applications and services are hosted in two separate networks—a core system 210 is hosted on the infrastructure of the service provider and a satellite system 240 which is hosted either the infrastructure of the customer or in a zone on the infrastructure of the service provider that is isolated from other customers.

The purpose of the core system 210 is to enable configuration, scheduled execution of searches and maintenance for the service provider. The core system 210 comprises: a core data store 235 in the form of a Microsoft SQL Server database; a core communications service 230 which exposes the core data store 235 to applications and other services in the core system 210 as well as the satellite system 240; a web server service in the form of a Internet Information Server (IIS) core web server 220 which transfers data via the core communications service 230; and a harvesting and trigger service 215 that transfers data via the core communications service 230.

The purpose of the satellite system 240 is to enable the users for a customer to perform their review. The satellite system 240 comprises: a satellite data store 270 in the form of a Microsoft SQL Server database; a satellite communications service 260 which exposes the satellite data store 235 to applications and other services in the satellite system 240; a web server service in the form of a Internet Information Server (IIS) satellite web server 250 which transfers data via the core communications service 230 and the satellite communication service 260; a workflow service 280 in the form of a Windows Workflow Foundation service exposed via Windows Communication Foundation which is used by the satellite web server 250 to manage workflow; and a workflow seed polling service that interrogates the core communications service 230 to pick up any new triggers to create workflow instances.

The method of communication between each of the difference services and applications in the core system 210 and the satellite system 240 is indicated by the legend provided in FIG. 2.

Figure 3A:
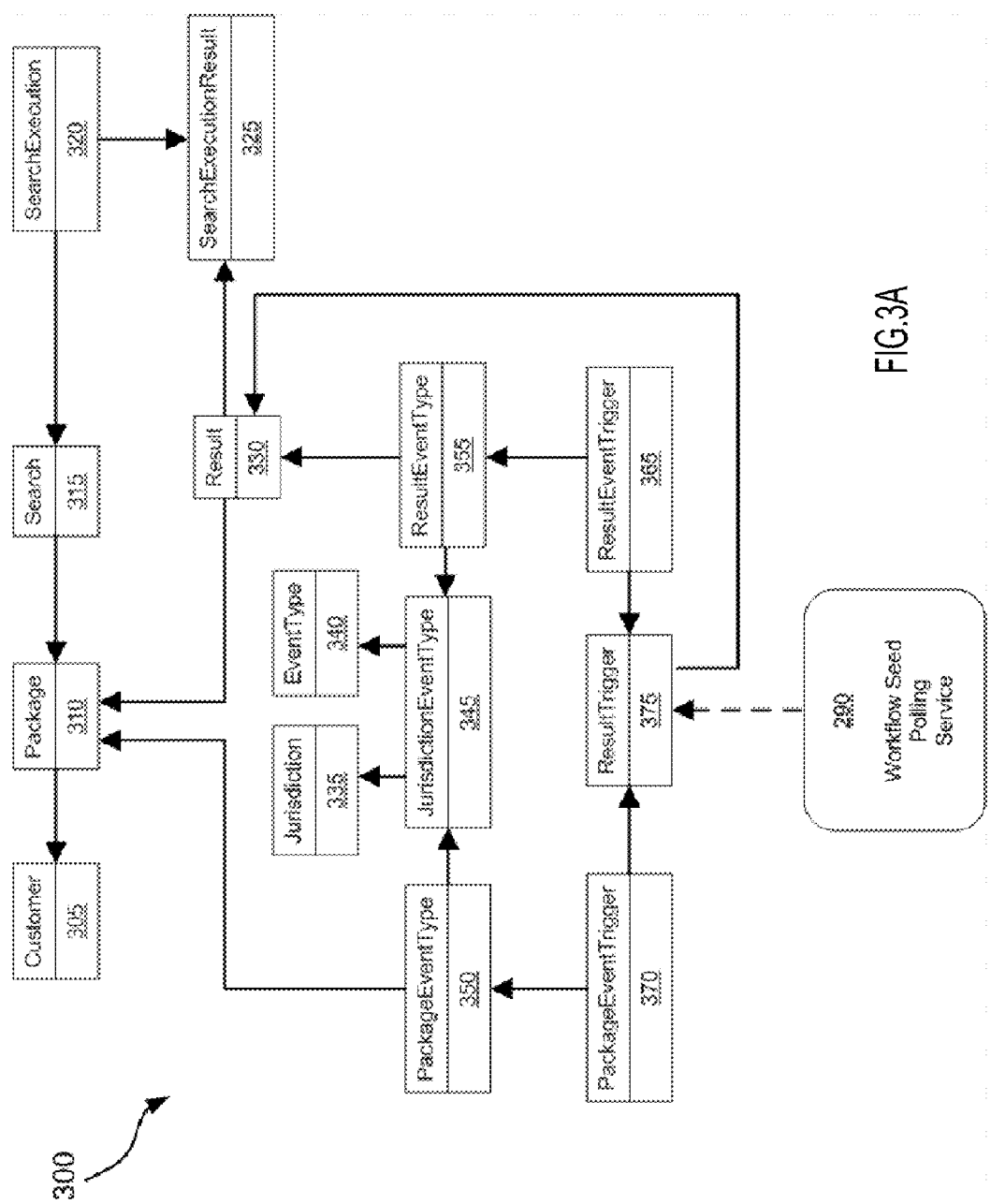
FIGS. 3A. and 3B illustrate a database table structure for implementing an example of the invention.
Figure 3B:
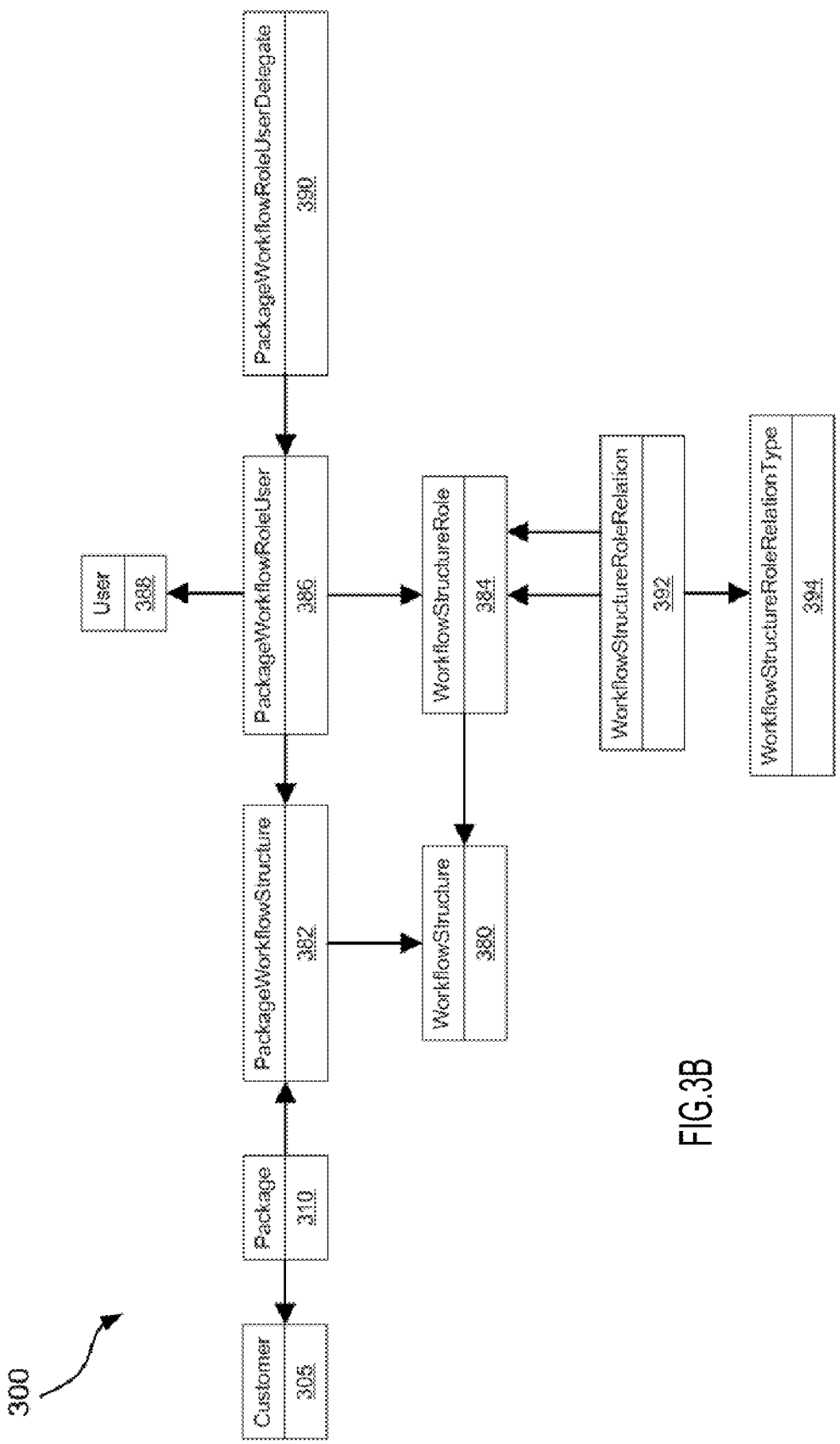

FIGS. 3A. and 3B. illustrate a database table structure 300 for implementing an example of the invention. Searches are grouped and referred to here as a package. A search produces results that are listed in the system and each represent an electronic document. In the database table structure 300 a customer 305 has one or more packages 310. Each package 310 has one or more search strategies 315—the execution of which is recorded as a search execution 320. Each search execution 320 will produce zero or more search execution results 325. The distinct results of the search execution results 325 for a package 310 are stored as results 330.

The example of the system provides an indication to the satellite system 240 that an event has occurred that must be subject to the review process defined by one or more workflows in the satellite system 240. These indications a called a result trigger 375. These result triggers 375 for a customer are picked up by the workflow and seed polling service 290 hosted by the satellite system 240.

The events that can cause the generation of the result trigger 375 are defined by a combination of what event type 340 and which jurisdiction 335 the event is occurring in—this is called the jurisdiction event type 345. For example, event types 430 for patent monitoring could include first publication, national phase entry, examination report issuing, acceptance, and grant of a patent. Jurisdictions 335 for patent monitoring could include WIPO, ARIPO, AU, US and EP. Only some combinations of event type 340 and jurisdiction 335 are valid.

The example of the system provides for the generation of the result trigger 375 at a package level or at a individual result level. These are called package event type 350 and result event type 255 respectively. The advantage of this is that, for example, a customer might want to monitor every AU national phase entry of PCT applications in a technology area. However, after the national phase entry result triggers are generated and the results are reviewed according to the workflow engine associated with that event for the customer—only a selected few relevant records would have been identified as relevant and addition event triggers created at the individual result level to alert a person or people in a role that the next relevant event has occurred. After results are created or updated in the system—the results are tested against the criteria defined by the package event type 350 and the result event type 255 and the resulting distinct list of result triggers 375 are created for each result trigger that did not already exist for the package. Also defined as part of the result trigger 375 is the workflow engine that will be seeded by the result trigger 375.

The example of the system provides for one or more workflow structures 380. These workflow structures 380 represent workflow engines that a running in the satellite system 240. The workflow structures 380 have one or more workflow structure roles 384 which are roles in which users can have in the workflow engine. Packages 310 are associate workflow structures 380 via a package workflow structure 382. Users 388 are associated with package workflow structure 382 via a package workflow role user 386.

The example of the system provides for users to delegate their roles for a defined period to another user. This is achieved by a package workflow role user delegate 390 that redirects actions for a package workflow role user 386 to another user.

The example of the system provides for users to be selectively provided with information relating to reviews based on a role hierarchy. This masking of information base on role is achieved by a workflow structure role relation 392 and workflow structure role relation type 394. The workflow structure role relation type 394 can also be used for other purposes apart from defining the visibility of comment from one role to another—other roles relations captured are for a given role—what roles can be requested to provide a review.

A package together with the role for the user in that package creates a context for the review of the electronic documents. A user can be in more than one role for a package.

Briefly, system of this example allows user to
read patent literature and other technical documents
provide feedback (i.e. indicate the outcome of their review) on the documents
make requests relating to documents
be notified when a document is related to two or more contexts or has been reviewed previously
receive notification when specific events relating to a document or package occurs
search previously located documents
request for new searches (i.e. packages)
delegate their reviewing responsibilities
view statistics on the time to review the documents
Sample user interfaces 120 as shown in FIGS. 4 to 8 that enable a user to use the user terminal 110 to interact with the web server 130 and to receive and display information stored on 140 and 150 so as to perform the above functions and further functions will now be described.

Each user is provided with a unique username and password that controls the level of access and information that user is able to view using the interface. The user enters their username and password in the conventional manner and is presented with the interface shown in FIG. 4 which is referred to here as the 'homepage'. The homepage 400 is divided into three sections: actions 410, searches 420 and overall analysis of packages 430. The homepage 400 also shows for security reasons the user name 440 that has logged in and the date that the user last logged into the system 445.

The navigation bar provides the summary 450 bar that that there are currently eight actions outstanding. Links or buttons within actions 410 allows the user to navigate to all the documents that require review or to navigate to a subset of actions according to the type of event that caused the action. The user can navigate to the complete listing of outstanding actions using the My Inbox button 455. The user can navigate to the actions just associated with the occurrence of an event by using the hyperlinks 460 over the event descriptions and number of actions such as "1 AU Accepted" and "2 Initial Reviews".

Figure 5A:
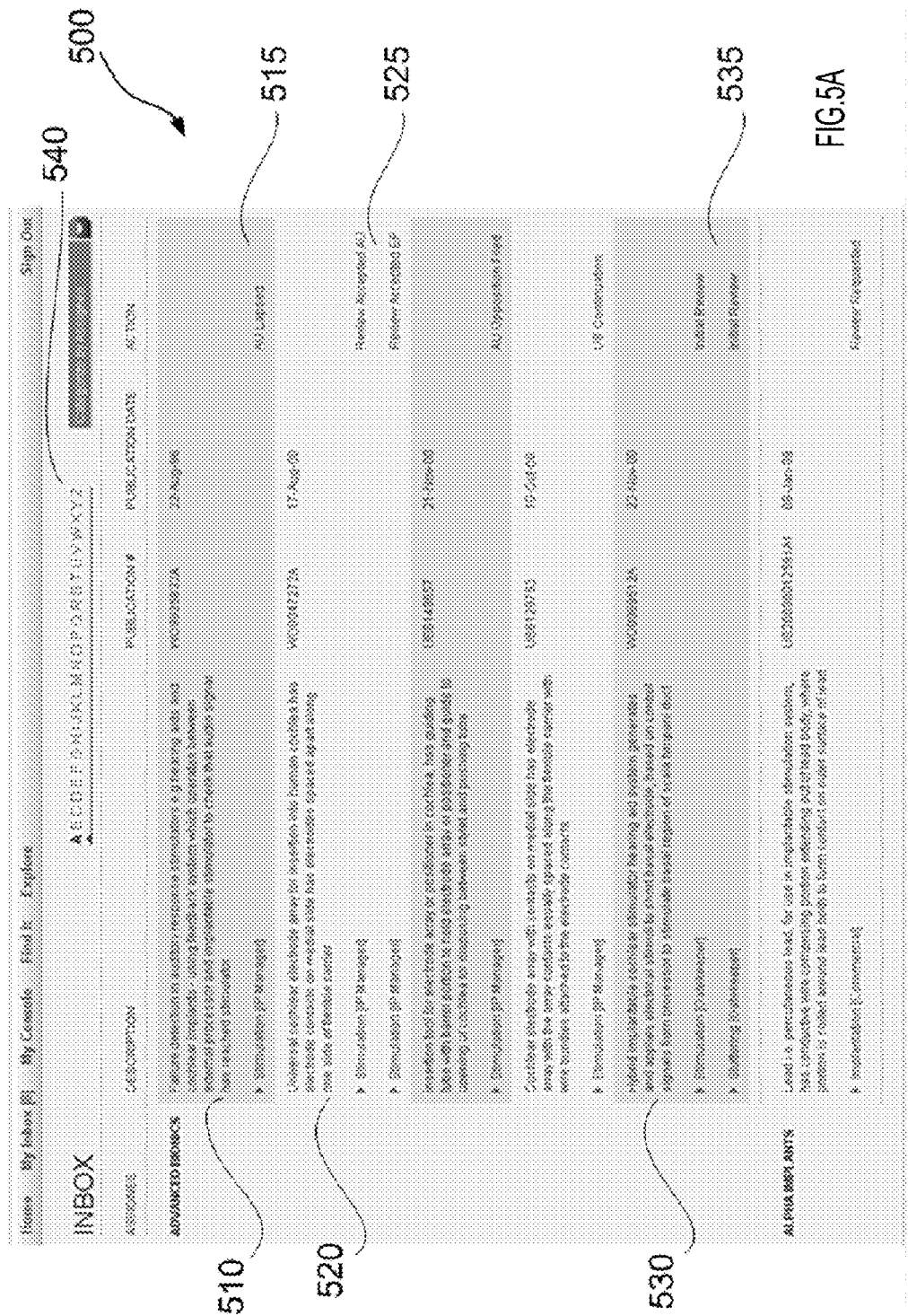

By selecting My Inbox button 455 the user interface 120 displays the interface 500 of FIG. 5A. The interface 500 displays a summary of all six documents of which are associated with eight actions in total. In the listing there are five documents in the name of the assignee ADVANCED BIONICS and one in the name of APLHA IMPANTS. Included for each listing is a description, publication number, and publication date.

In the example, a context is defined as a reviewing from a unique combination of business area, role and event occurring.

The first listing 510 has an outstanding action of in the context 515 of the Australian patent lapsing and the need for it to be reviewed in relation to the business area of stimulation from the perspective of an IP Manager.

The second listing 520 related to the same business area of stimulation and the same role of IP Manager—but it has to be reviewed from the perspective of the Australia patent being accepts as well as the European patent being accepted The fifth listing 530 is related to the same role of gatekeeper and the same event of the initial review of the first international publication—but it needs to be reviewed from the perspective of both the stimulation and stuttering business areas of the client.

Figure 5B:
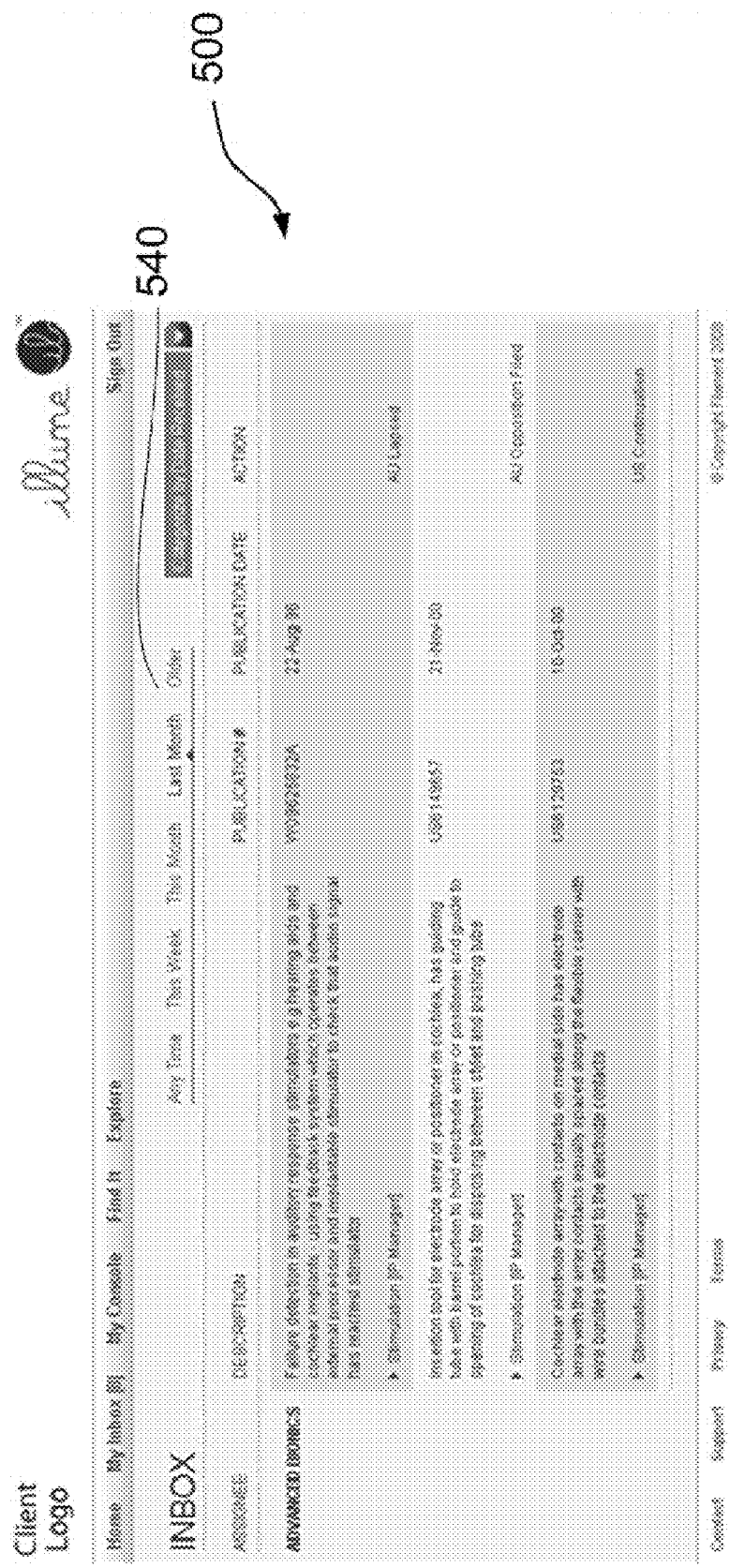
Figures 5C, 5D:
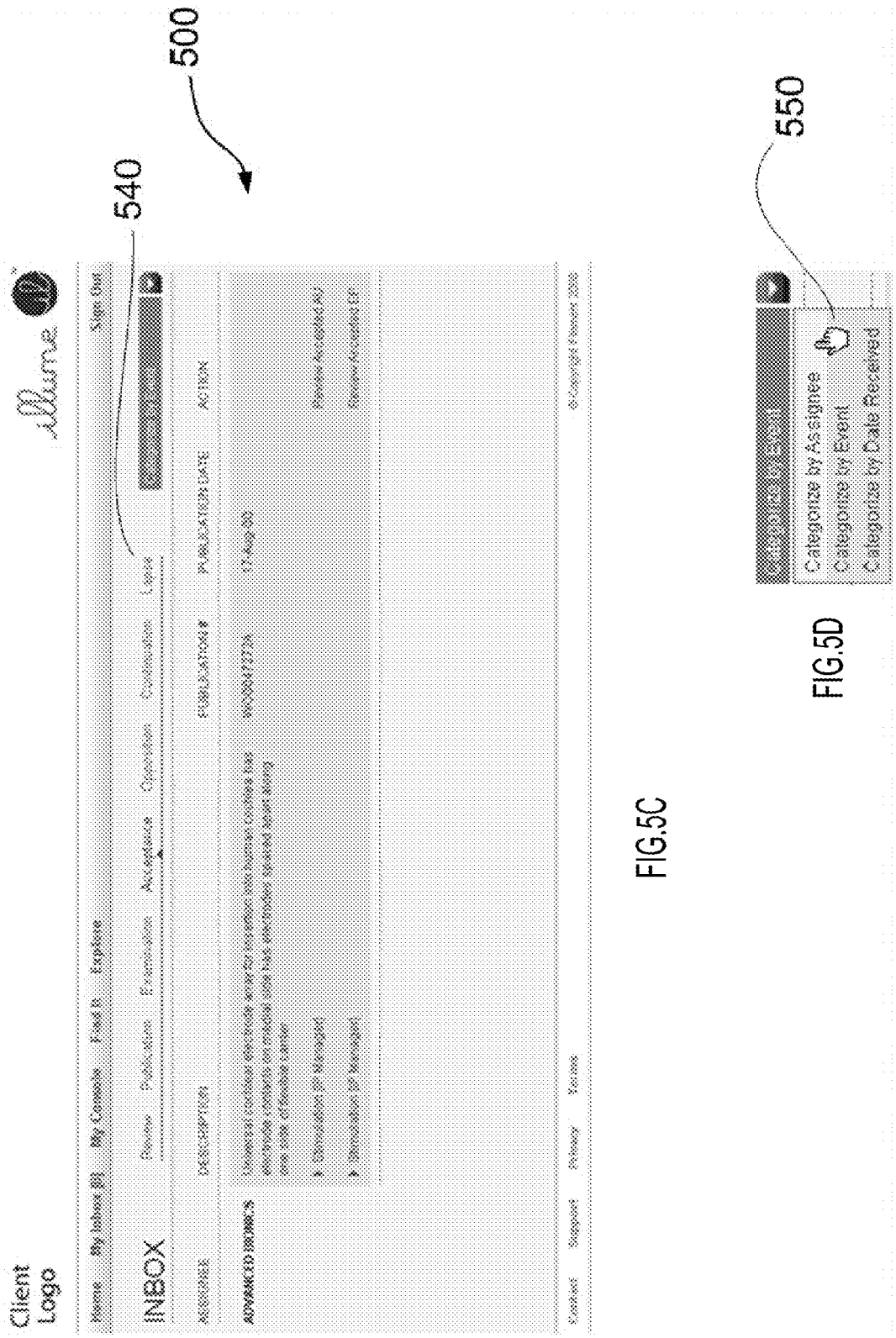

FIG. 5A to 5C illustrate the different modes in which to view the records in the inbox. In each mode there is a record set navigation bar 540 to provide for selecting groups of records when listing in each mode The selection of the mode is shown in FIG. 5D in which the select box 550 shows options of modes that categorise by assignee, event or date. Other possible mode might include by role or by business area.

The documents in the inbox can be ordered by date as shown in FIG. 5B. On this interface 500, all documents that were received as new search results within last month is displayed in a similar manner as described in reference to FIG. 5A. A subset (or page) of records, which in this case is a period of time can be selected at 540 to change the documents listed as being outstanding actions from any time or outstanding actions from this week, this month, last month or older than last month.

Alternatively the documents in the inbox can be ordered by the event as shown in the interface 500 of FIG. 5C. All documents shown in the interface 500 are those documents in the inbox where the action is derived from the Acceptance of an application. A subset (or page) of records, which in this event that caused the action can be selected at 540 to change the documents listed as being an internally requested review, a new publication, examination report issuing, acceptance, opposition filed, continuation being filed or lapsing.

Figure 6A:
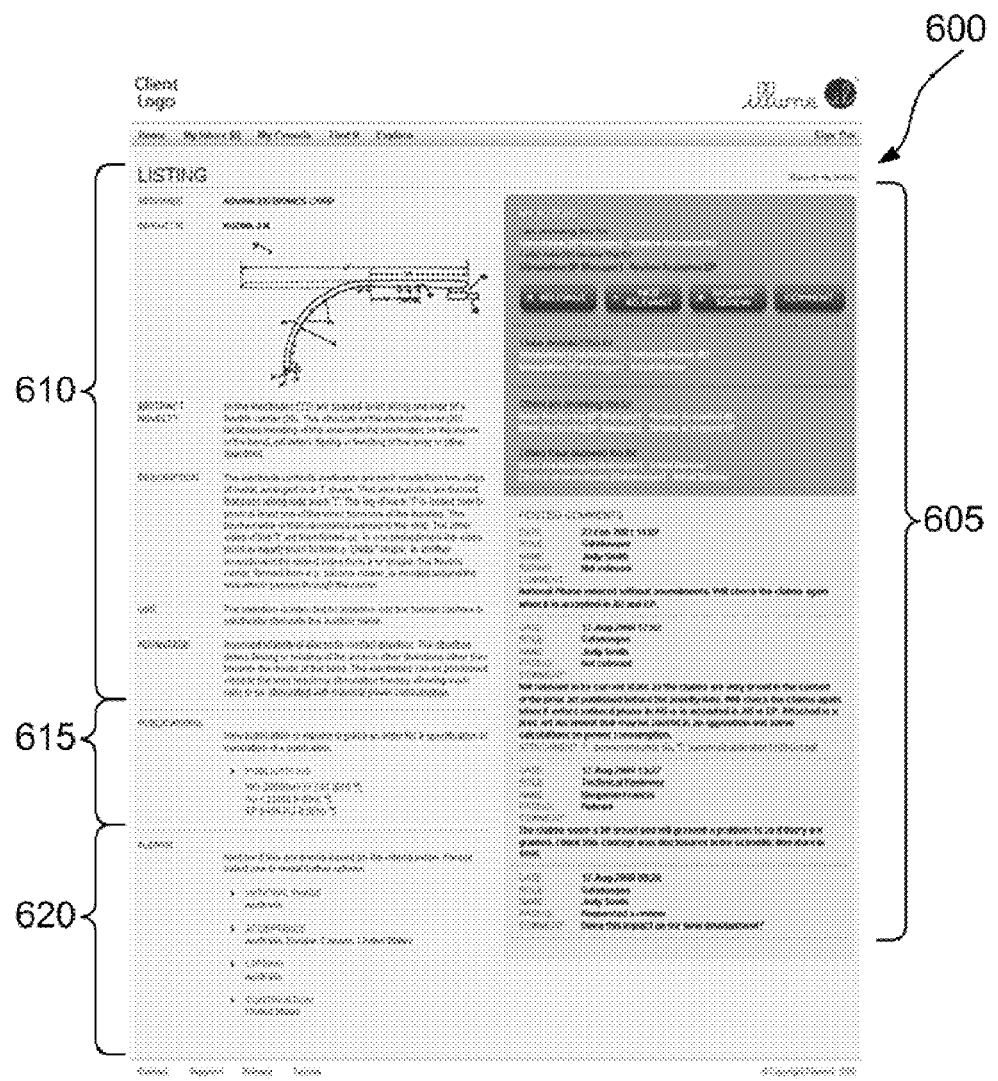
FIGS. 6A and 6B are sample screen shots of the interfaces that allow a user to enter an indication of their review of the document, request a published version of the document or a translation of a publication and enter a request to receive a notification when a particular event occurs.
Figure 6B:
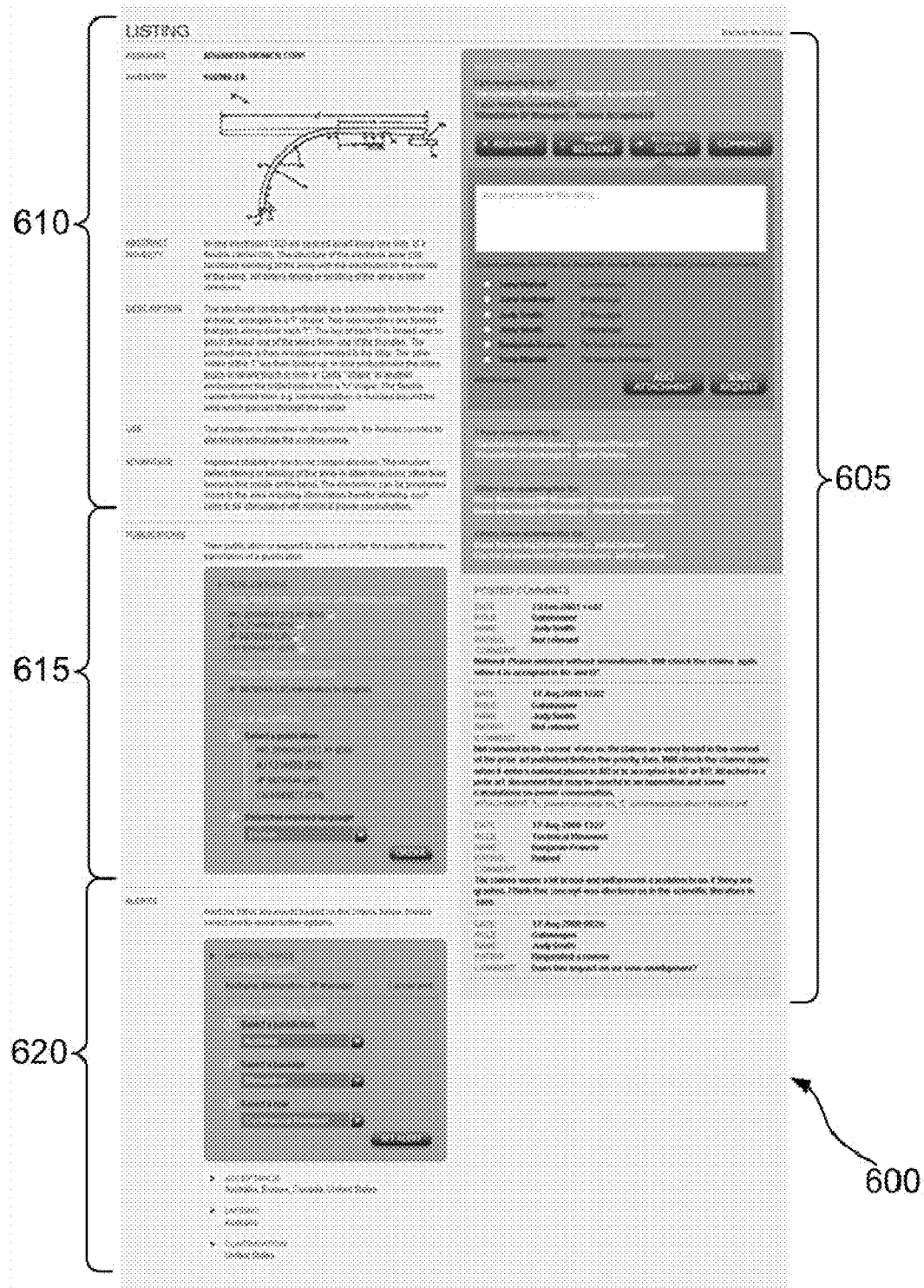

By clicking on the information describing a document in any list of FIGS. 5A, 5B or 5C the user is presented with a new interface 600 as shown in FIG. 6A. On the right had side is a reviewing action pane 605. On the left hand side is summary information 610 associated with the listing. Below the summary information 610 on the left hand side is a publication action pane 615. Below the publication action pane 615 on the left hand side is an alerts action pane 620. Each of the reviewing action pane 605, the publication action pane 615 and the alerts action pane 620 are active elements on the interface and can assume different states—such as those illustrated in FIG. 6B.

The summary information 610 associated with the listing which includes a summary of the document including the assignee and inventor details and an abstract is also shown which includes a information on the novelty, a brief description, use and advantage of the invention described in that document. The type of metadata information displayed can vary depending on the audience for the information. For example, if the audience was an attorney, they may also like to see the attorney that filed the application, and the earliest priority date in addition to the fields shown in the screen shot.

Figures 6C, 6D:
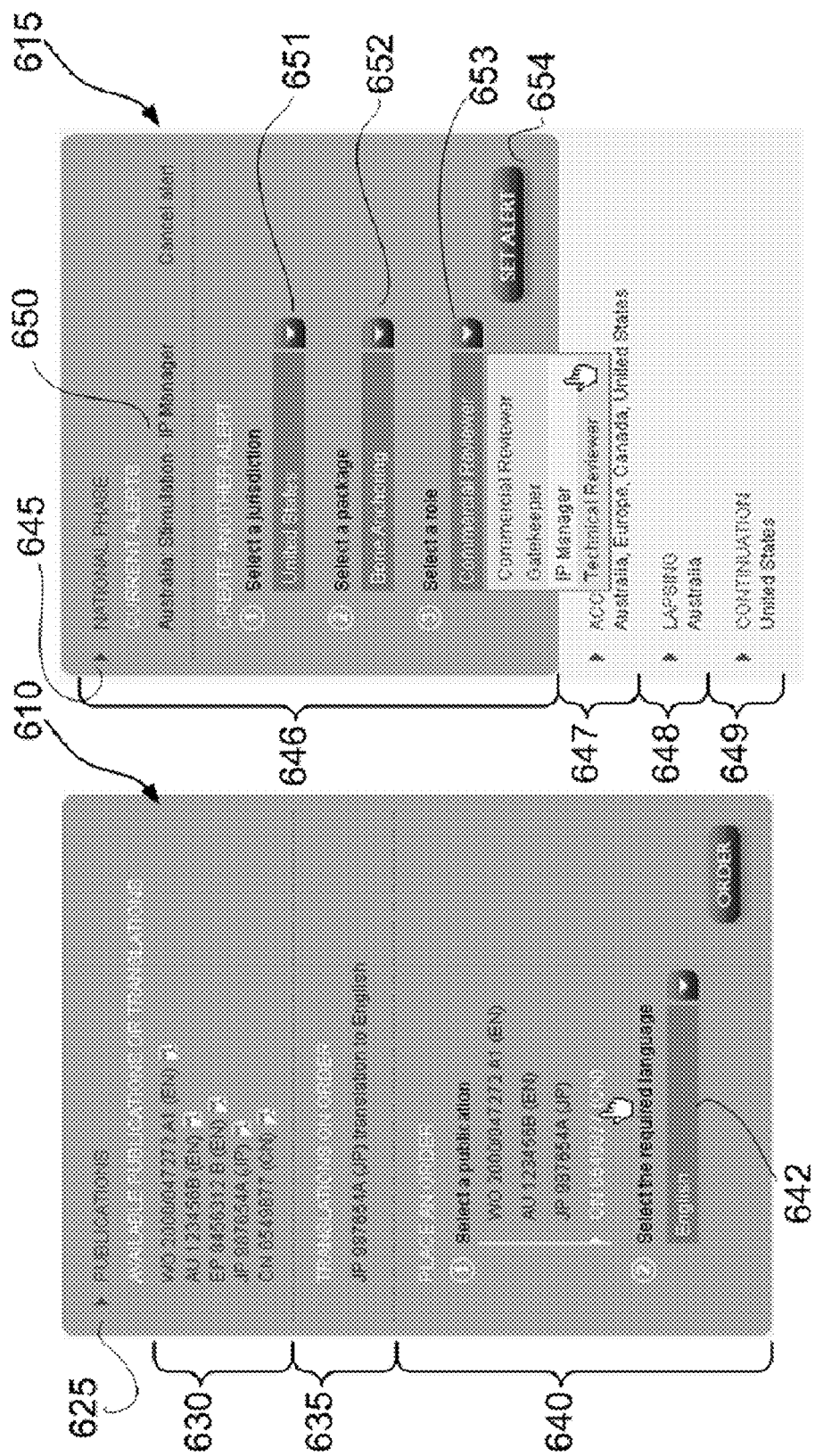
FIG. 6C is a sample screen shot of the interface that allows a user to request a published version of the document or a translation of a publication.
FIG. 6D is a sample screen shot of the interface that allows a user to enter a request to receive a notification when a particular event occurs.

The user can view or obtain a copy of the document as published or order a translation of a document in the publication action pane 615 shown in more detail in FIG. 6C. A full version of the options available to the user are only displayed when the user expands the publication action pane 615 using a toggle control 625.

A patent family or a patent application may have multiple publications. For example, the listing in FIG. 6C has patent publications 630 of an international PCT application, a granted Australian patent, a granted EP patent, a Japanese patent application and a Chinese abstract. In this case, each document already has the original document available in PDF format. If it was not already available, the user could use the use the use the place an order interface 640 to an order for a copy of any one of these patent publications 630.

The user is not limited to requesting the document in its native publication language and may wish to request a translation of one of these publications. To do this the user selects a language in from the select list 642 in the order interface 640 that is different to the publication language listed. Any translation ordered but not yet delivered is displayed in the translations on order section 635 of the interface. This prevents the user from ordering the same translation twice. Any translations that have been ordered and completed in the past are available added to the list of patent publications 630. In the example, a translation of the Japanese patent into English has been ordered. Ordering translations in this manner also ensures that the same document is only translated once for each of the different areas of the company.

Referring to FIG. 6D the user alerts action pane 620 to indicate that they wish to be alerted (i.e. notified) about certain events. The options for alerting are grouped by event type. In the example alerts action pane 620 there are the event types of national phase 646, acceptance 647, lapsing 648 or continuation 649 (also including within its definition patent of additions). A full version of the options available for the event type are displayed when the user expands a section the alerts action pane 620 using a toggle control 645. A similar method is used to add events for acceptance, lapsing or continuation. Other possible event types include examination, re-examination, opposition or any other event that is recorded for the type of listing being reviewed.

The interface shows the national phase event 646 expanded. To prevent the user from requesting an alert that has already been requested for this event, a current alerts summary 650 is displayed from which the alerts can also be cancelled.

A new alert is created by selecting from a jurisdiction select list 651 the national phase alert that needs to be configured. The user also selects from a package list 652 which of the multiple packages that the document relates to this alert concerns, and then selects from a role list 653 which role of user roles within that package will receive the alert. Once each option is selected, a set alert button 654 is pressed and the alert will then appear in the current alerts summary 650.

A summary of the action requested 620 from the user is displayed on the right hand side of the interface 600. The summary of the action includes the title of the package, the user role in the package, and the event that has occurred (i.e. context) 655 that the listing displayed is currently being reviewed by the user for, which in this case is reviewing the accepted Australian patent for relevance to the role of an IP Manager in the topic area of stimulation.

Using reviewing action pane 605 the user is able to enter into the interface an indication of their review. This can done by indicating whether the document is relevant in this context by selecting RELEVANT 656 or NOT RELEVANT 657.

In this example the user selects that the document is RELEVANT and a new mode of interface 605 is displayed as illustrated in FIG. 6F. This enables the user to provide further feedback on their review that the document is relevant, such as providing a text based comment in the text box 658. Supporting documentation can all be associated with the user's review by selecting ADD ATTACHMENT 659. The user then selects APPLY RATING button 660 which causes the user's review to be stored (discussed further below) and this review action is removed as an outstanding action in the user's actions 410 summary on the home page.

Figure 6E:
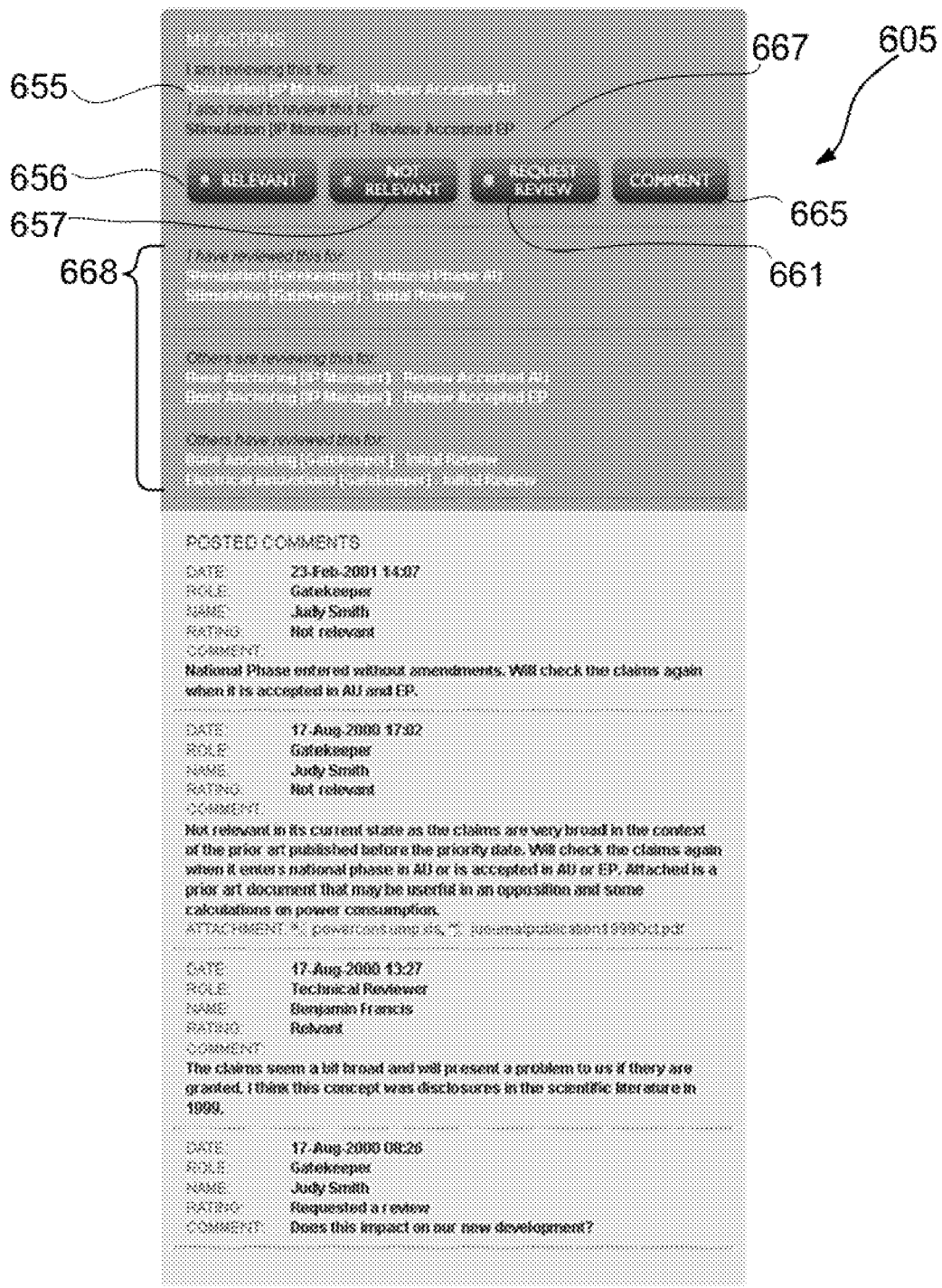

Referring back to the interface 605 of FIG. 6E, similar comment and attachments can be made if the user selects NOT RELEVANT 657 instead.

If the user selects REQUEST REVIEW 661, a new mode of interface 605 is displayed as illustrated in FIG. 6H. As shown, this interface 605 shows a list 662 of other users that the user can request a review from. Here six unique user/role combinations are listed. As before, an attachment 663 can be added to the request. The user selects one or more users by checking the corresponding box and selecting SEND REQUEST 664. As a result this document will now appear in the inbox of the users selected from the list 662. In this way the user can get the opinion of one of their colleagues.

The user's review may simply be a comment without entering a rating of selecting RELEVANT 656 or NOT RELEVANT 657. This is done by selecting COMMENT 665 and the user enters comments into the text box 666 that appears as shown in the interface 605 of FIG. 6I. This can also include attaching a document as described above.

Referring back to FIG. 6E, the interface 605 also displays information 668 on the other packages that the listing relates to. It also states that the must review the listing in relation to another context 667. That means that the user is informed at the same time they are reviewing in a first context that they also have review in other contexts. This will save the user time as they can read the document keeping both packages in mind Also displayed is the names of packages that the document is also being reviewed for or has been reviewed for. In this way the user is able to see whether the document has already been identified as relevant in other packages, and if already reviewed what the reviews were. In this example, the names of two packages that the current document 226 is also being reviewed in relation to is listed at.

The reviews made by other users on the document is also displayed, that way the user can assess straight away whether they are in agreement with previous reviews in this context. Two sample reviews are shown at on interface. Each review includes the date, name of the user, role of the user, the rating entered by the user and a comment. As identified at the second review also includes attachments which can be viewed by clicking on the attachment name.

Figure 6J:
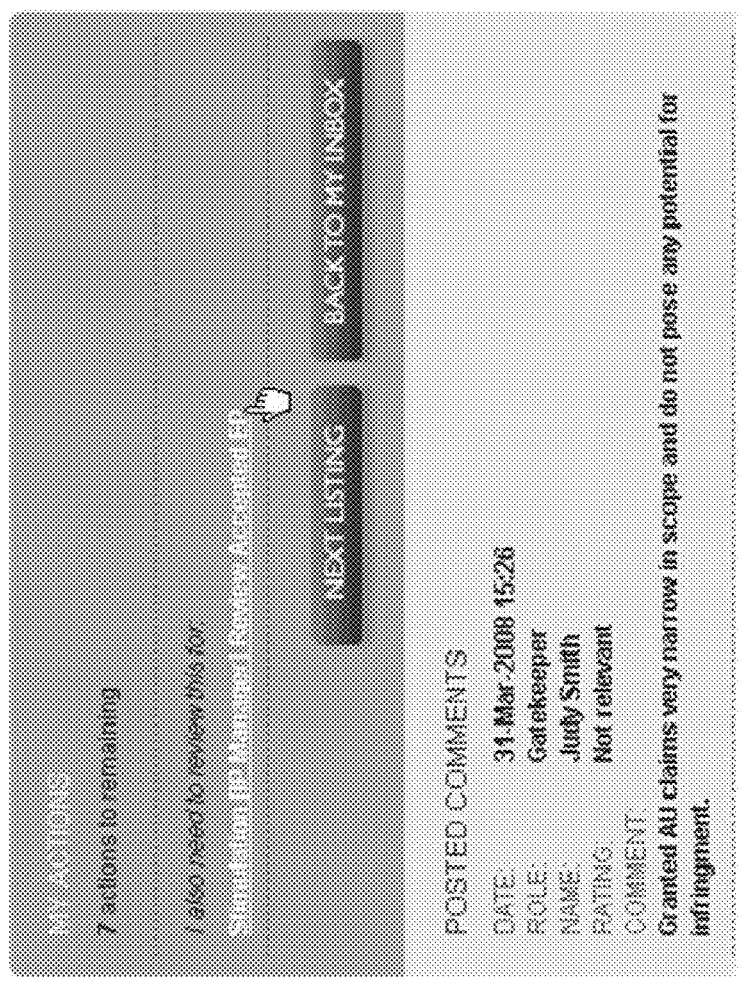

Once the user enters in their review of the document in the current context, the user is then presented with an interface 605 of FIG. 6J inviting the user to enter their review of the document in relation to the other context for which the user must still provide their review for. This helps to encourage the user to enter all reviews of the document in the different contexts before moving onto the next document. This should help prevent the user having to reread the same document.

Figure 4:
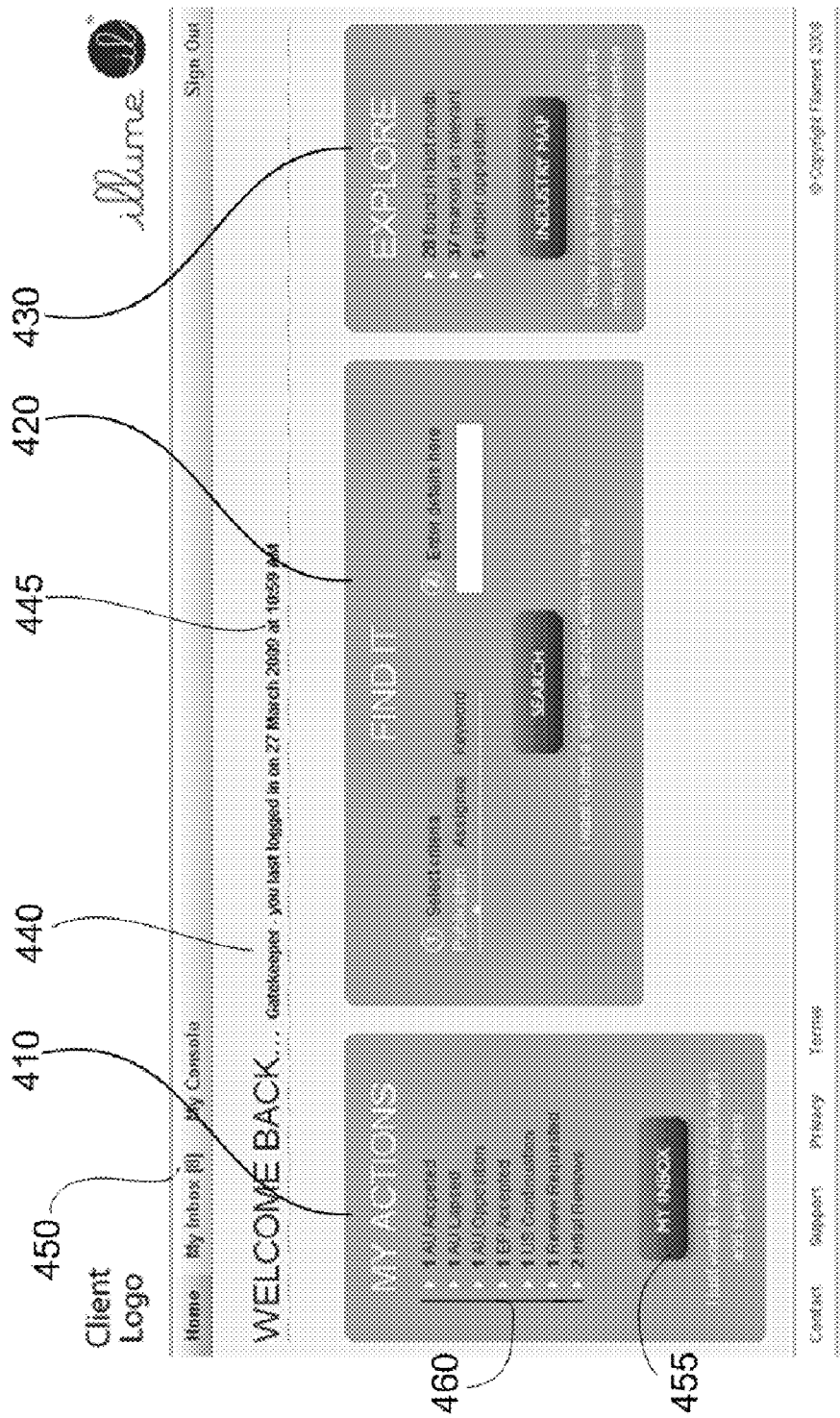
FIG. 4 is a sample screen shot of a 'homepage' interface that is used to help facilitate the review of document.

Referring back to the homepage of FIG. 4, the FIND IT 420 category will now be described in further detail. This category allows you to search through all documents that have been identified in one of the packages.

Similarly to the listings in the INBOX category, the documents can be searched based on publication information, assignee, keyword or category to produce a list summarising the documents that meet the search criteria in the same was as described with reference to FIG. 5.

Referring again to the homepage of FIG. 4, the explore action 430 will now be described. The interface summarises the documents located by the all search packages and displays that there are 28 documents found in the last month with 37 documents currently marked as relevant and that there are 5 patent properties related to documents that are under opposition.

Figure 7A:
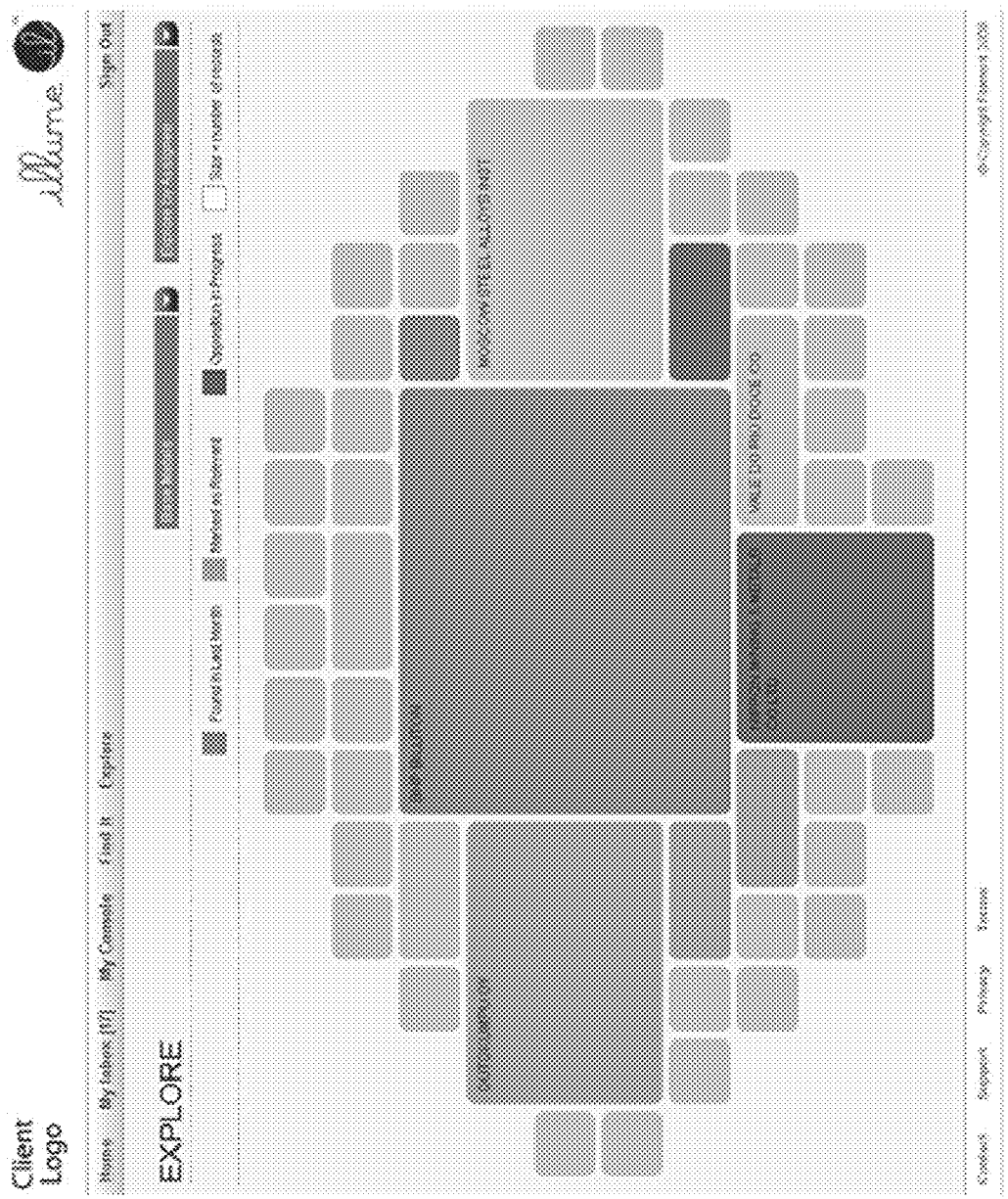
FIGS. 7A, 7B and 7C are sample screen shots of the interfaces that that allows a user to explore the patent activity by assignee as located by a search package.

By selecting the industry map the user is then presented with the interface 700 of FIG. 7A which includes a map-like representation of the patent activity in a particular context. The context is selected by selecting the package name from the pick list. Here the second package is selected. The patent activity can also be filtered by classification by using the second pick list.

The documents are filtered by the selected package, classification, and then grouped by assignee/inventor. Each unique assignee/inventor is displayed as a separate icon in the map, in this case a round rectangular shape. Each rectangle is labelled with the name of the company/inventor, in this case by way of example the rectangle is labelled OUTOKUMPU OY.

The size of each rectangle is proportional (with respect to each other) to the number of patent properties owned by that assignee/inventor that are associated with the located documents. Each icon is also shaded a particular colour, where each colour describes the patent activity of the company. For example, one colour may indicate that there is a current patent alert regarding that assignee/inventor. Another colour may indicate that the assignee/inventor has filed new patent applications within a determined time period. Yet another colour may indicate that the assignee/inventor has not filed any new patent applications in that determined time period. Overall, the map provides a good summary of the patent related competitive space associated with a technology area of a particular package.

Figure 7B:
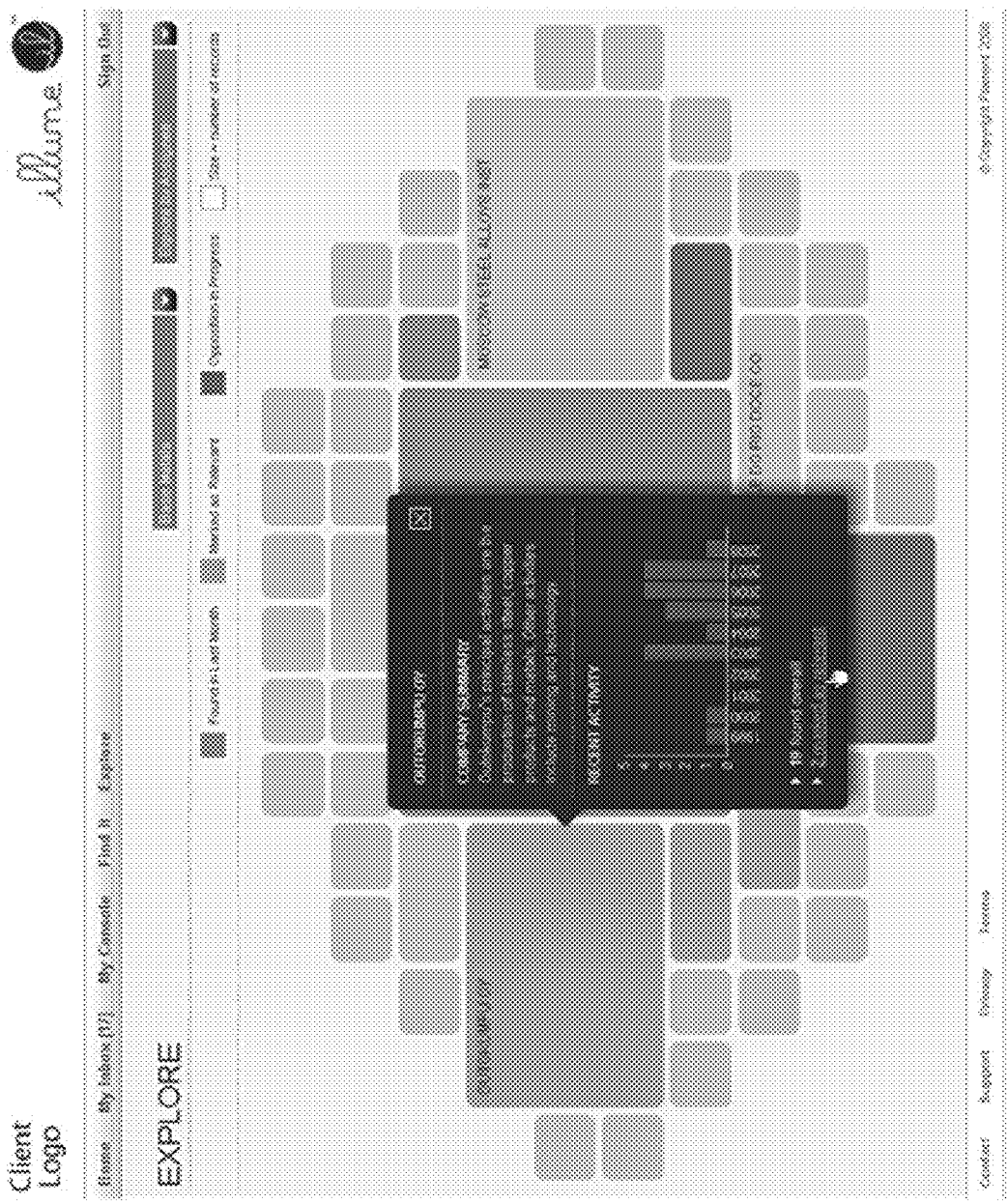
Figure 7C:
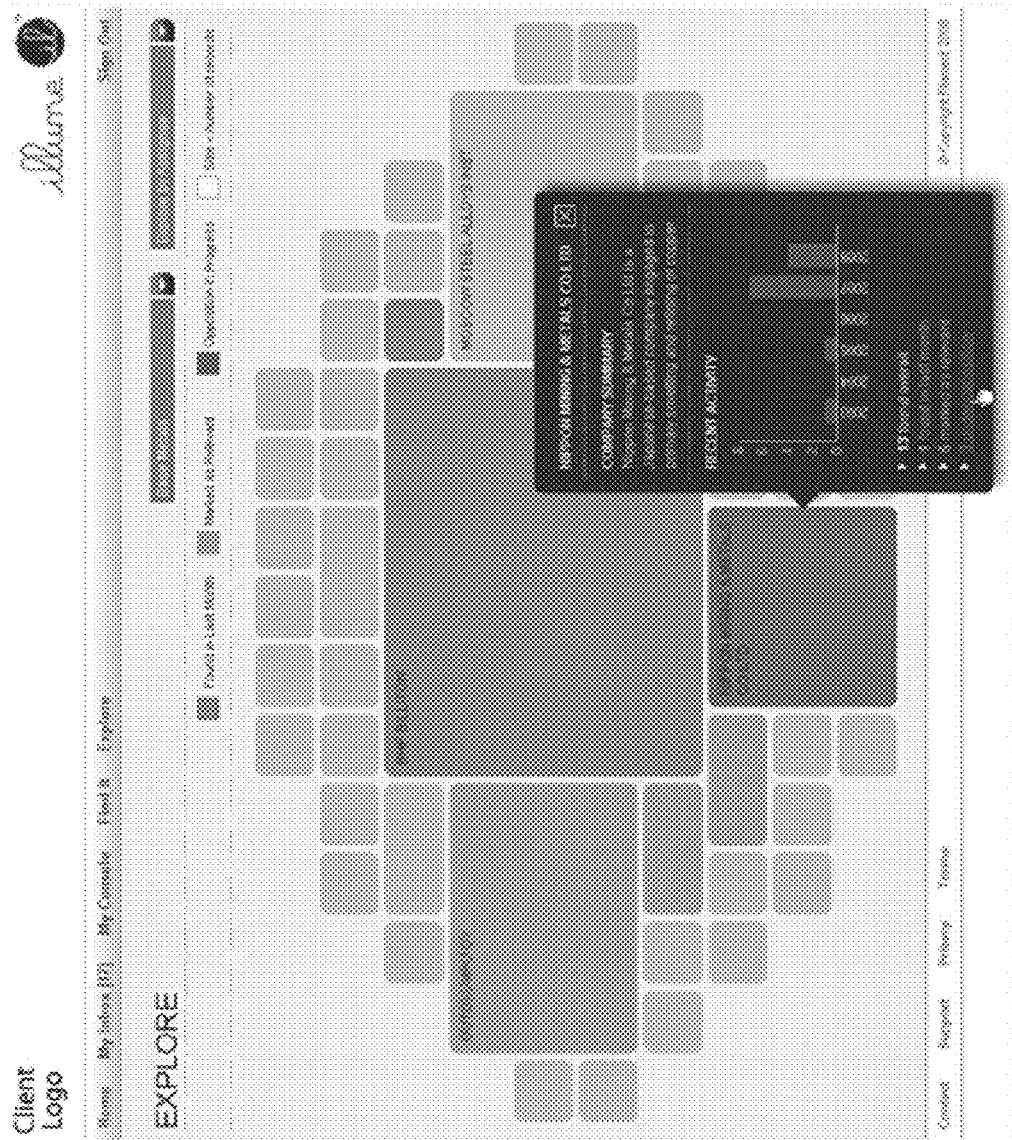
Figure 7D:
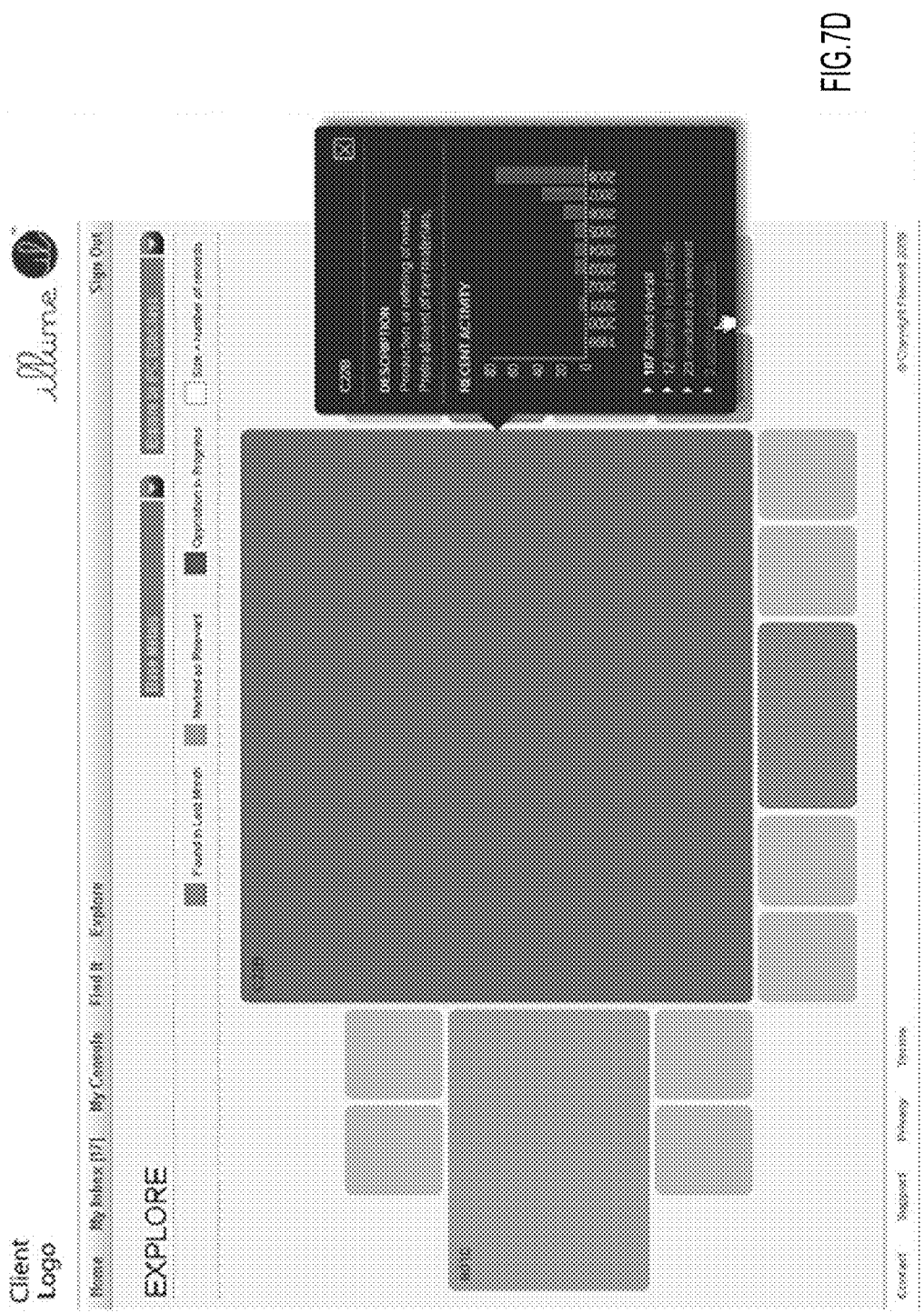
FIG. 7D is a sample screen shot of an interfaces that that allows a user to explore the patent activity by classification as located by a search package.
Figure 7E:
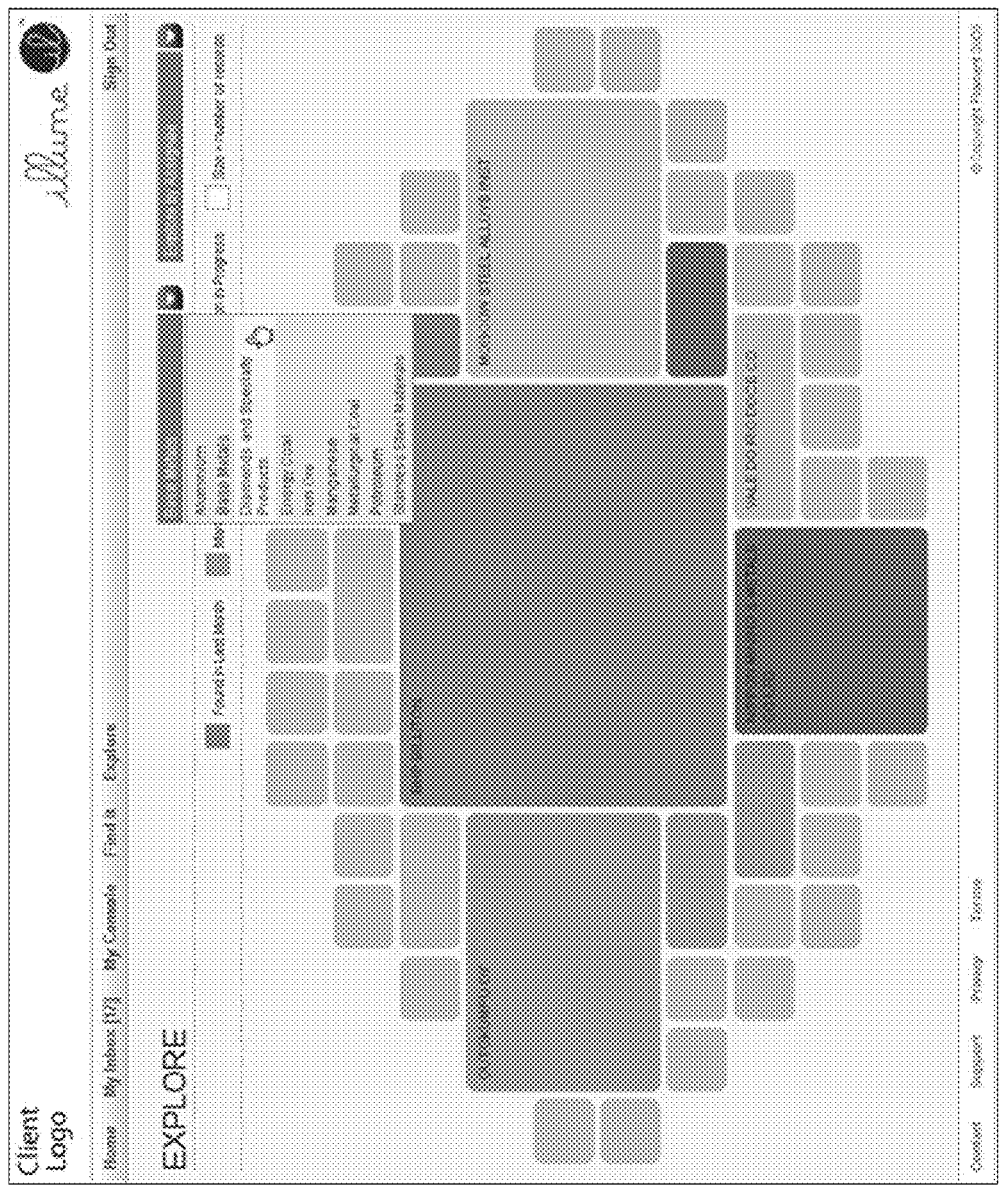
FIGS. 7E and 7F are sample screen shots of the interfaces that that allows a user to select a search package and a grouping method to explore.
Figure 7F:
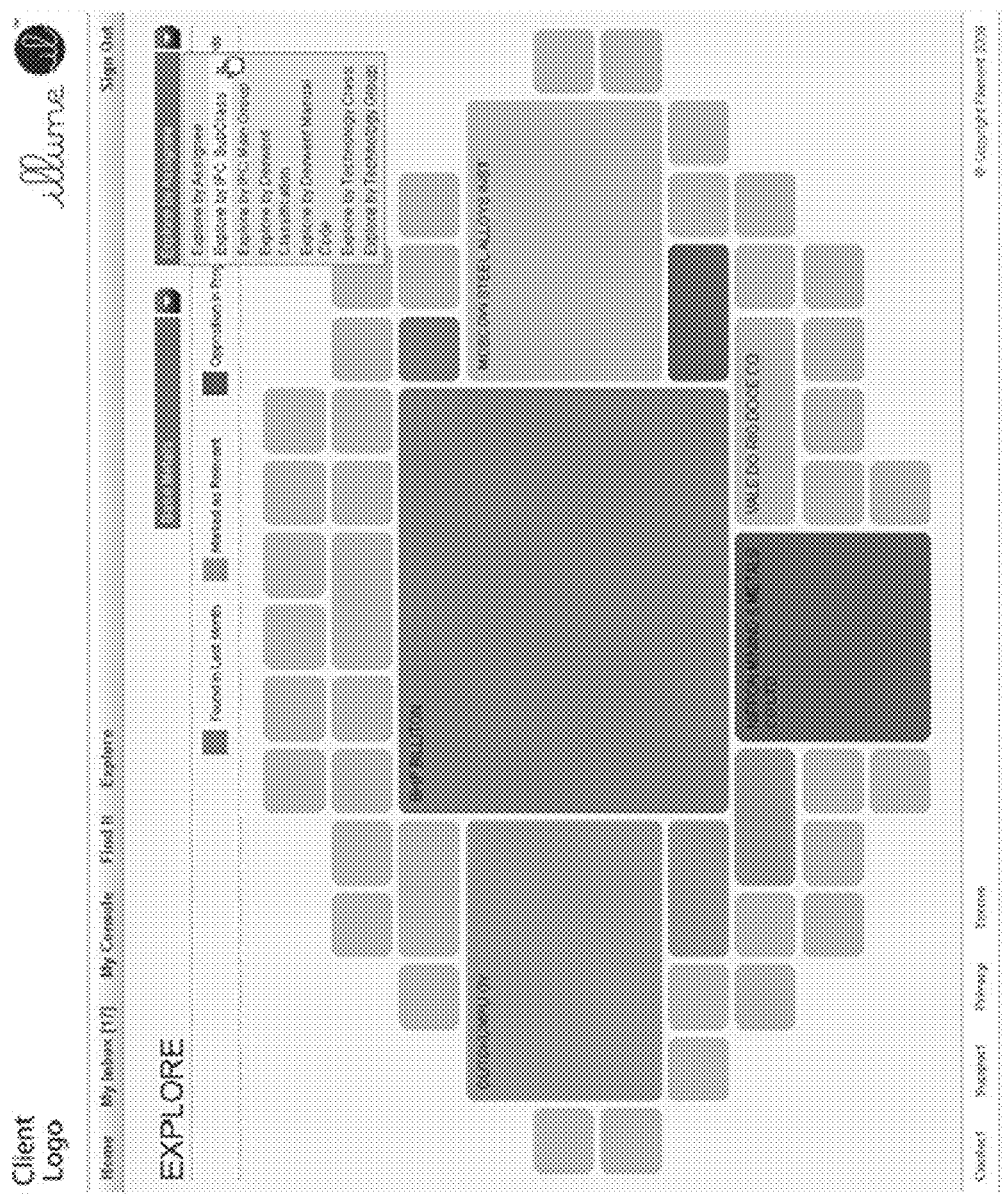

The user is able to obtain details of the patent activity of any assignee/inventor represented as an icon by selecting the relevant icon, such as by clicking on or rolling over the icon with a mouse pointer (not shown). This causes the interface to change as shown in FIG. 7B. The box appears overlayed on top of the map. It can include one or more of the following information about selected assignee/inventor:
   the country of origin
   list of competitors to this assignee/inventor
   a brief description of the assignee/inventors commercial operations
   graph showing the number of new patent applications filed over previous months
   total number of patent applications filed in the last few years
   the number of patent properties that have been reviewed by users and considered relevant Referring back to the homepage FIG. 4, the user can select MY CONSOLE and is then presented with the interface of FIG. 8B. The user has previously entered their details, a new password, a photo and a description. They can also nominate to receive e-mail alerts by checking the box. That means that if the user receives in their inbox a new listing, they will receive an email notifying them of this.

Importantly, using this interface the user is able to delegate all or part of their reviewing responsibilities to another user. This feature is useful for when the user is away from the office temporarily, or is unable to perform the necessary reviews. Alternatively, it can be used to delegate all their responsibilities which will ensure that the departure of the user as employee of an organisation does not mean that some of those responsibilities are no transferred and lost. This helps ensure that reviewing of documents continues, avoiding backlogs and delayed identification of relevant documents that require further action.

Figure 8A:
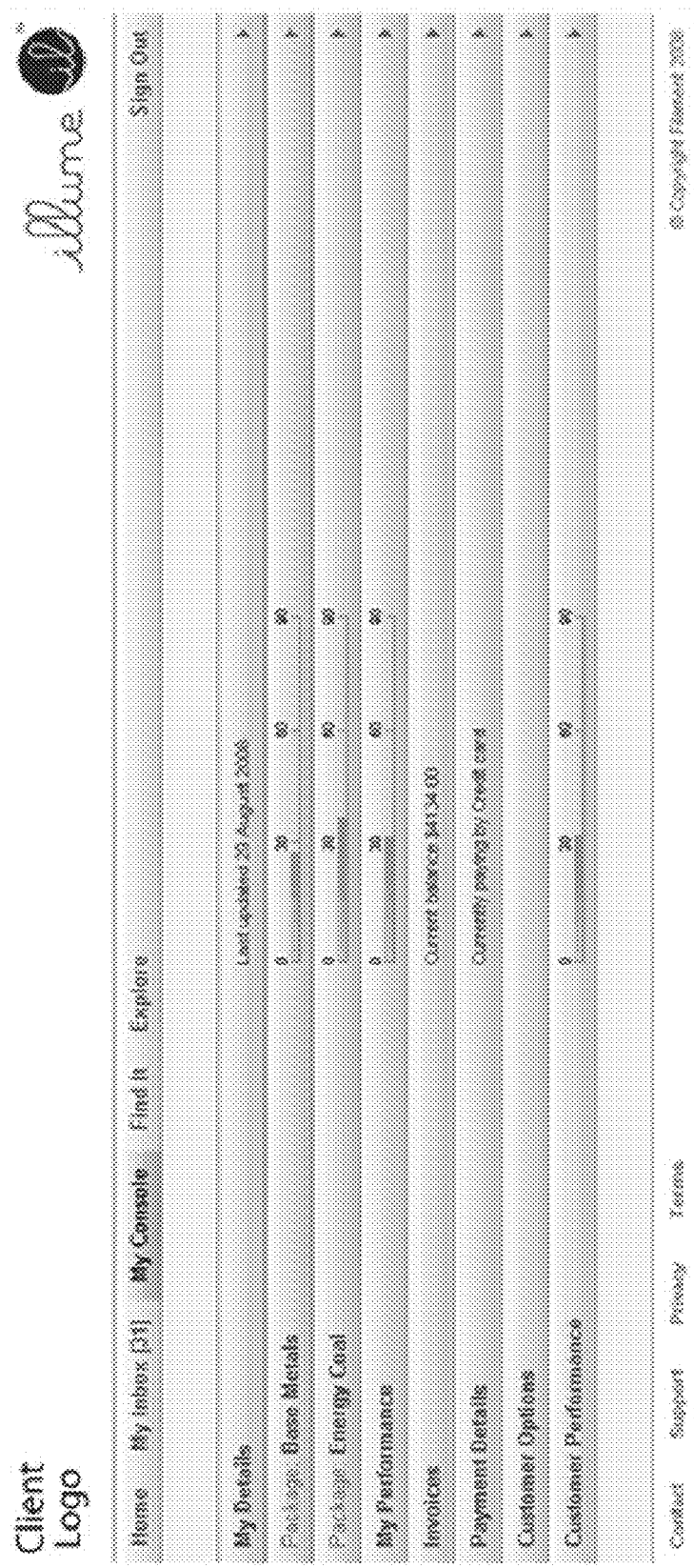
FIG. 8A is a sample screen shot of the interface that allows a user to view and update setting to which they have permission to access and update.
Figure 8B:
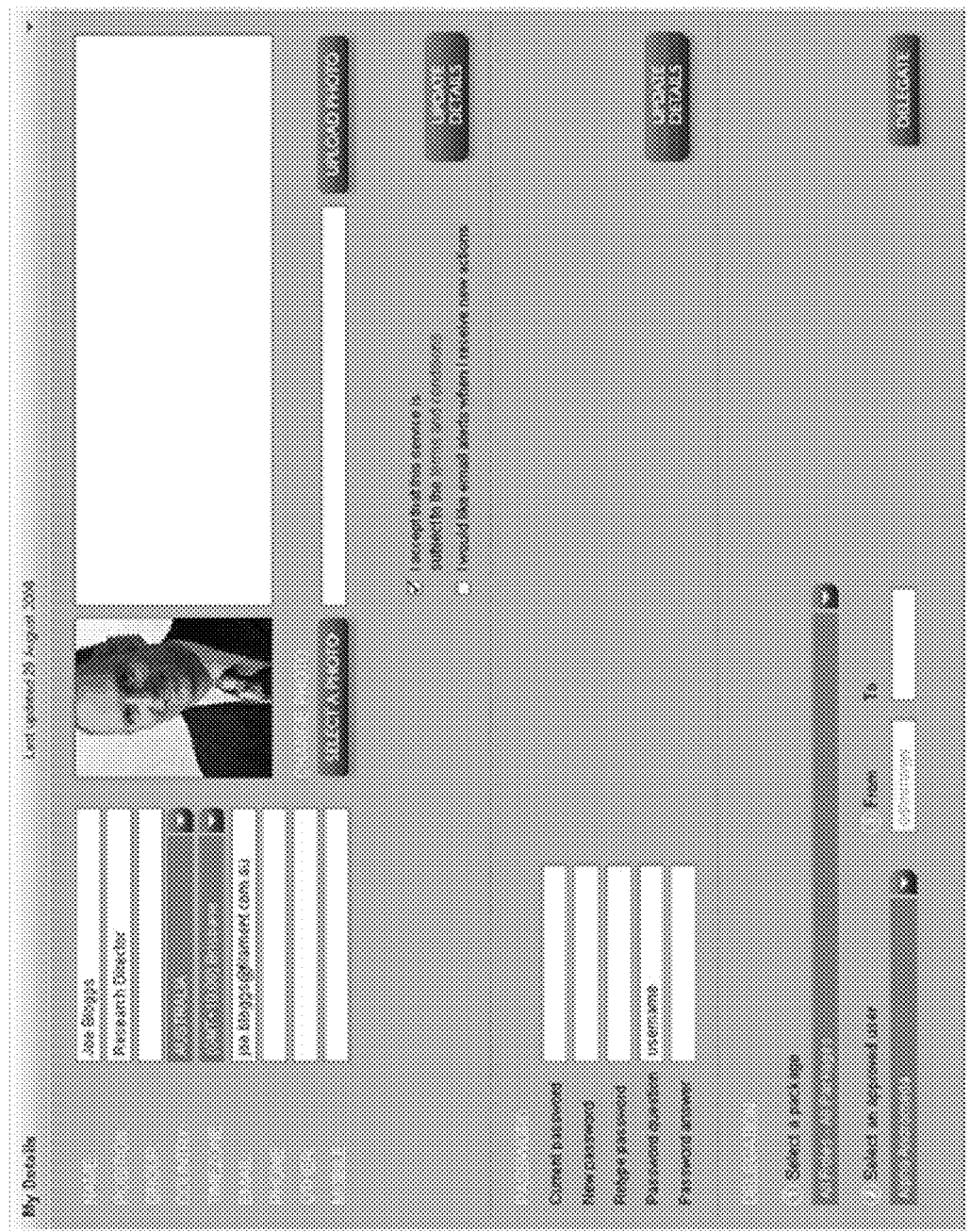
FIG. 8B is a sample screen shot of the interface that allows a user to review their details and delegate their role.
Figure 8C:
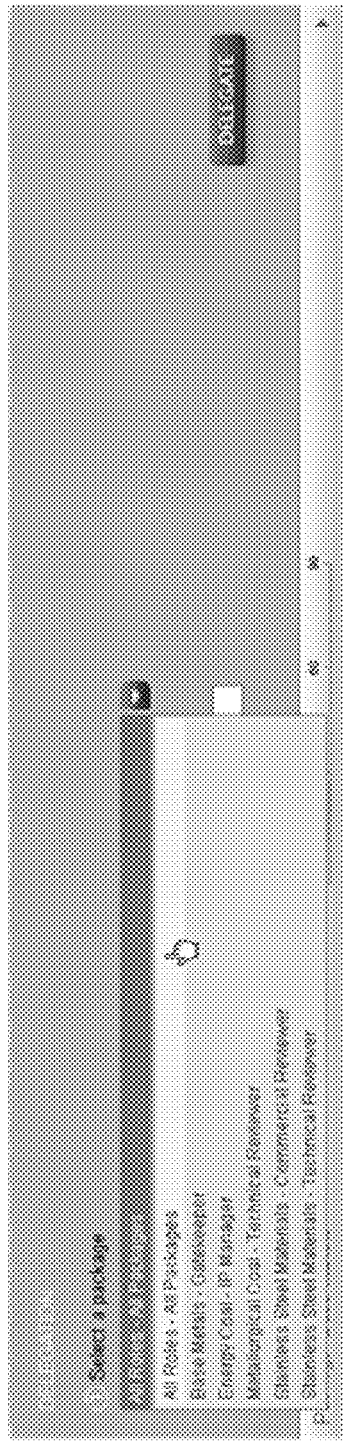
FIGS. 8C and 8D is a sample screen shot of the interface showing the package and alternate user options available when a user delegates their role.
Figure 8D:
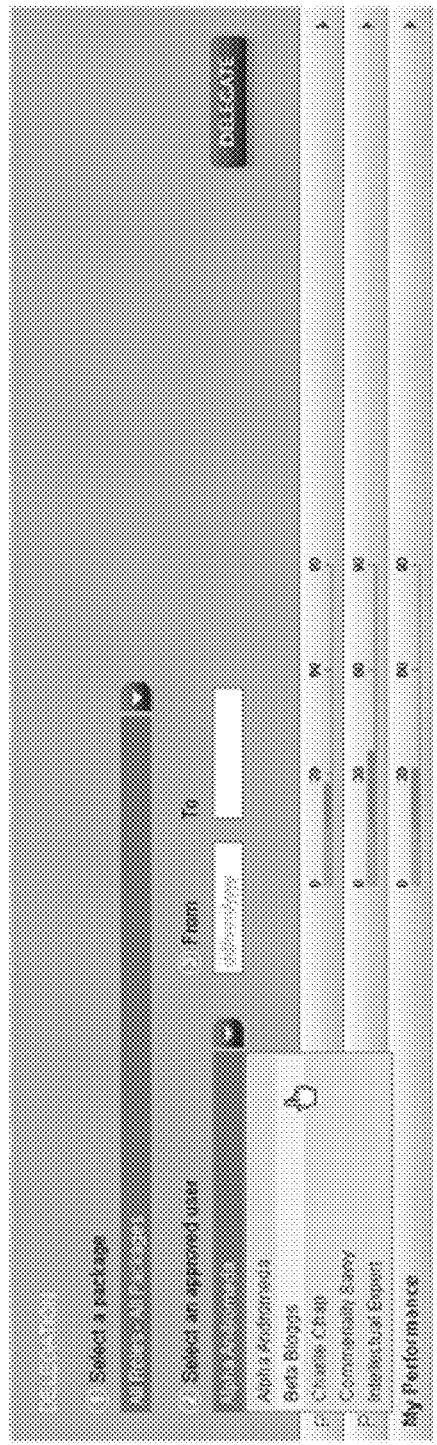
Figure 8E:
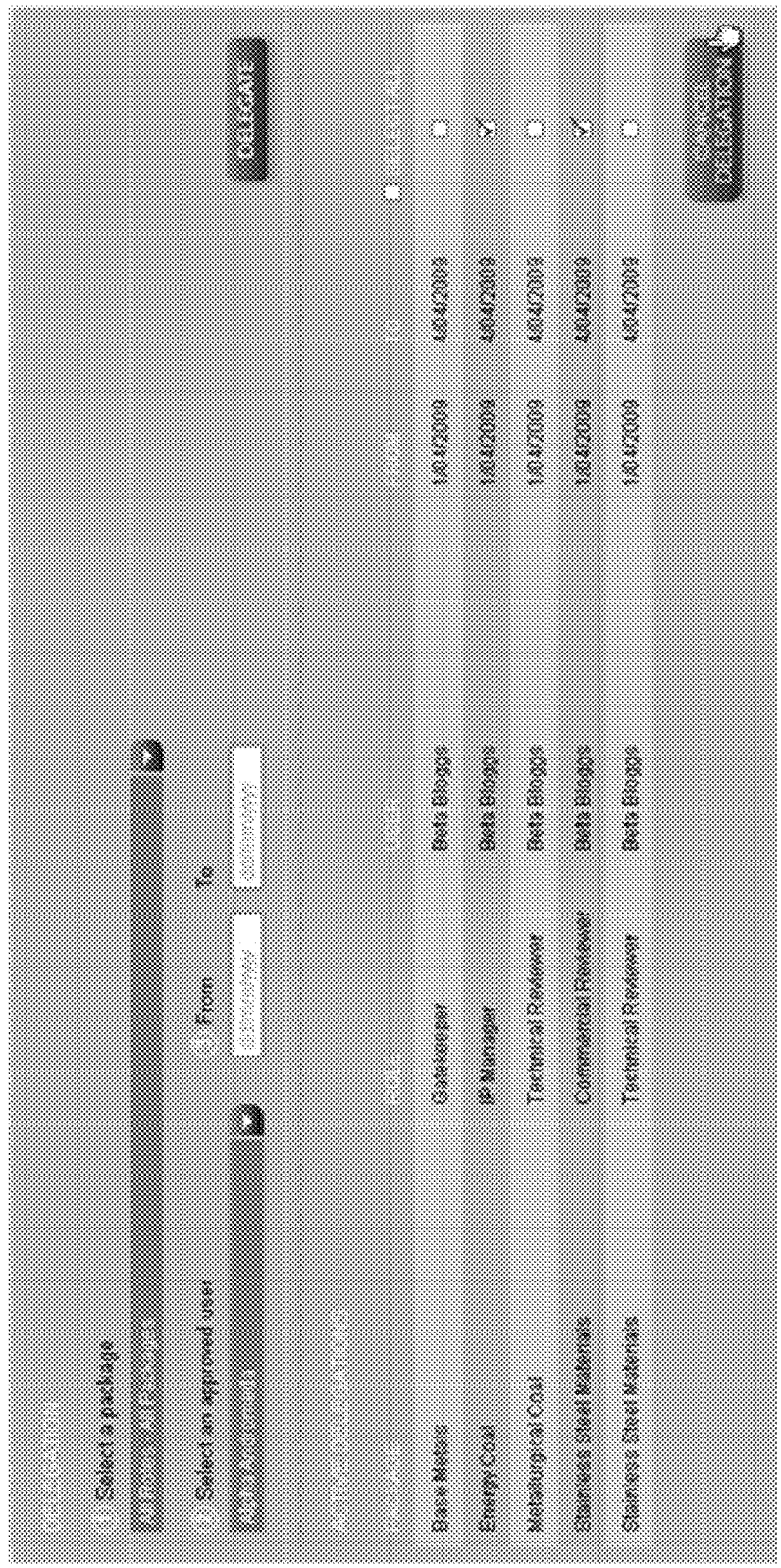
FIG. 8E is a sample screen shot of the interface that allows a user to review current active delegations and delete selected delegations.

The interface of FIG. 8E displays a summary of all the delegations the user has previously made. This includes the name of the package, the name of the person they have delegated to, and start and end dates of the time that they are responsible. Between these dates the nominated other user will be able to access the documents related to the respective package and perform the necessary reviews.

The user can create a new delegation by selecting the package that they have a reviewing responsibility for from the pick list. A list of users that have the authority to receive a delegation for the selected package is then listed in the pick list. The user enters in a start and end date for this new delegation and selects DELEGATE. A reviewing role previously delegated to the user can be delegated further in this same way.

The user can cancel one or all of these delegations by selecting one or more of the check boxes and selecting CANCEL DELEGATION. If the other user that the current user has delegated to has themselves delegated the responsibility to yet a further user, both of these delegations would be automatically cancelled.

Alternatively (not shown), the delegation can be to multiple users simultaneously, a delegation of a role type across one or more packages to another user, for all of the users roles simultaneously.

Figure 8F:
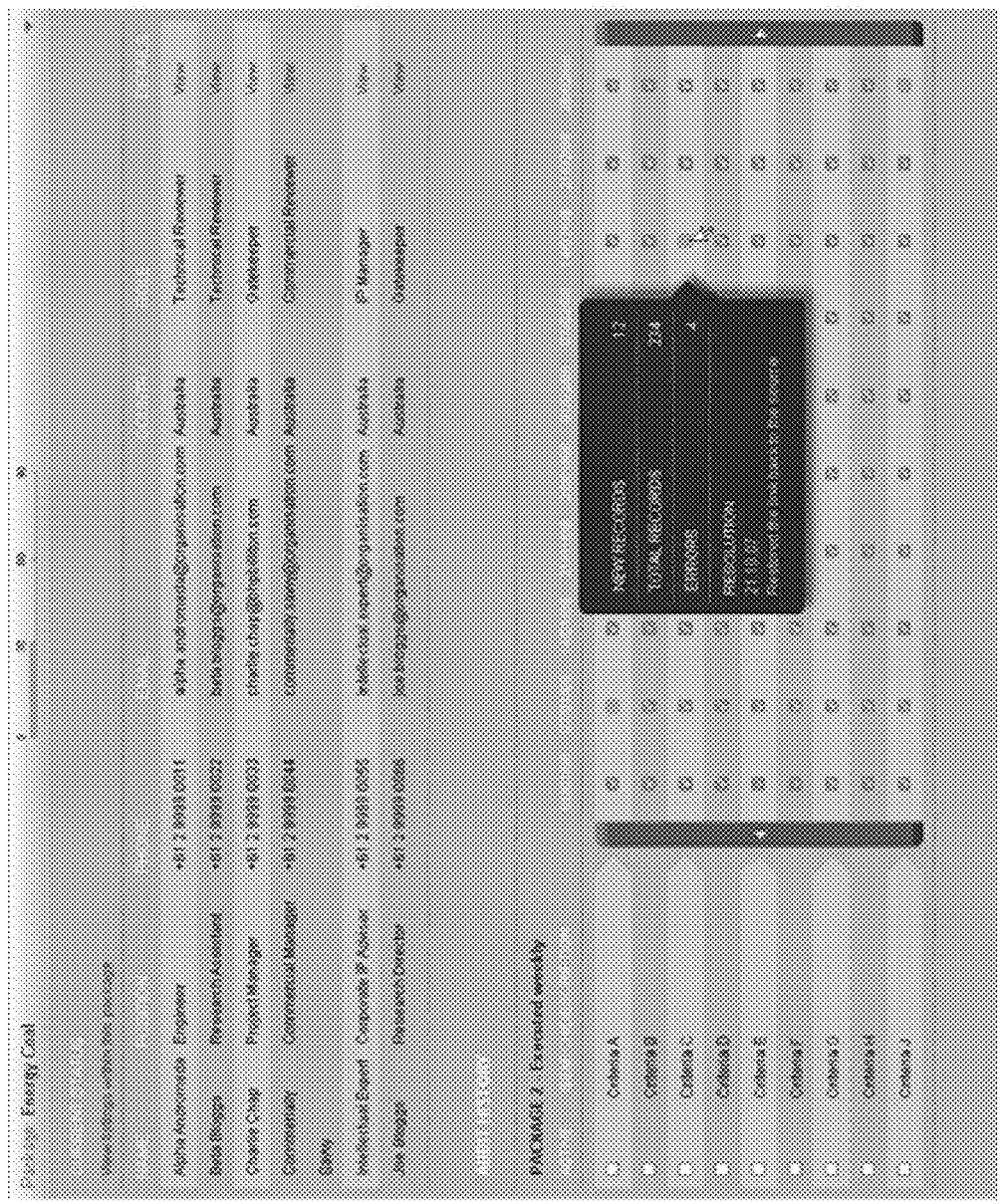
FIG. 8F is a sample screen shot that allow the user to review the status and audit package searches.
Figure 8G:
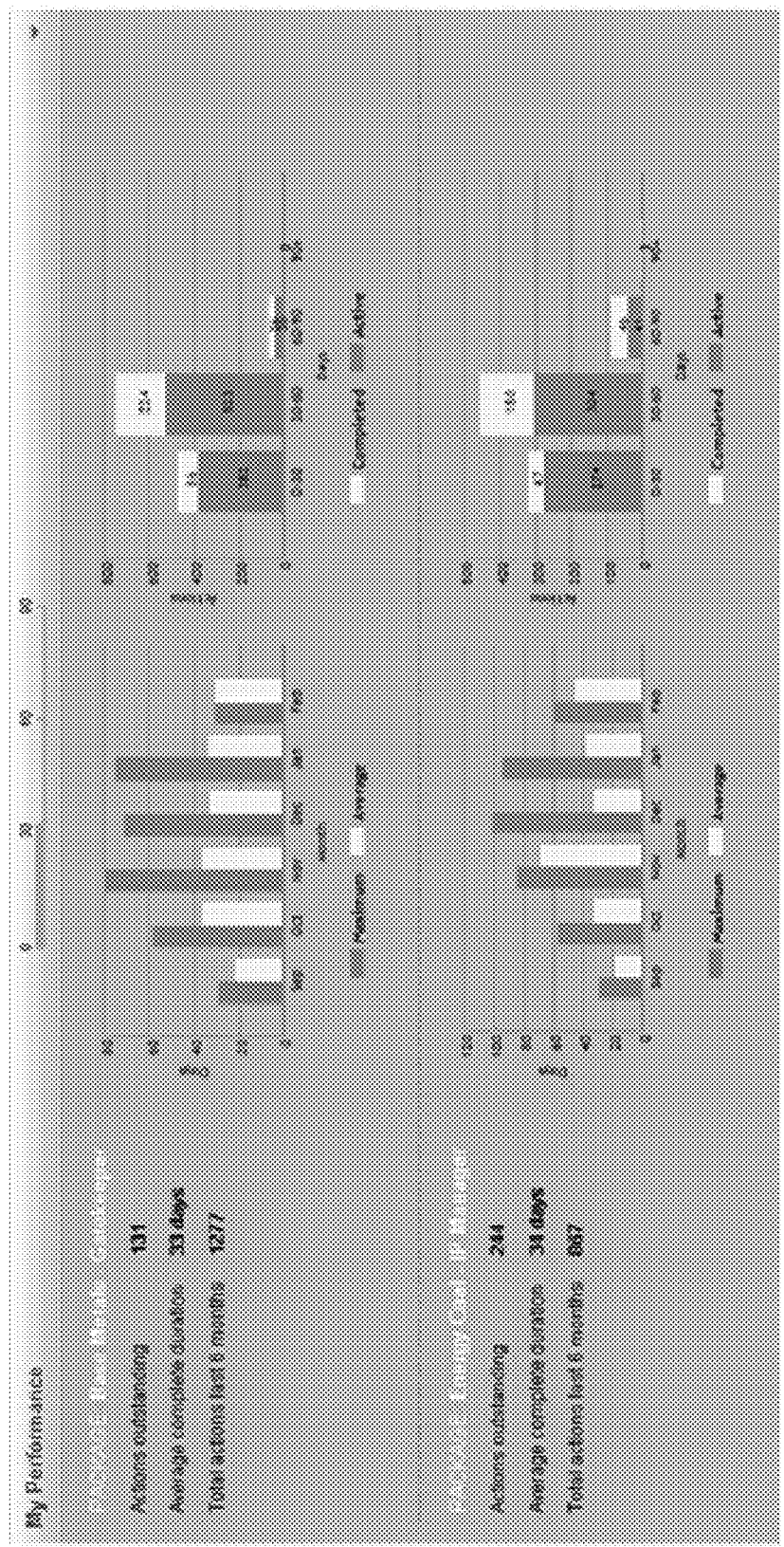
FIG. 8G is a sample screen shot that allows the user to obtain a summary of the timeliness and quantity of reviews for the current user.

A further part of the interface is also shown at of FIG. 8F. All the packages that the user has an associated reviewing responsibility is described. Here the package ENERGY COAL is described. All users associated with the package, known here as the team, are listed at and includes their name, their position in the client company, their location, their role within the package and link to further details about the user.

A link is provided on the interface which will present the user with an interface similar to FIG. 5A which lists all the listings located for this package.

Depending on their access rights a user may have access to other administrative functionalities.

Interface of FIG. 8F allows the user to view a history of executed searches. The name of the package audited in this interface is ENERGY COAL. This package is programmed to execute weekly and has a number of criteria as listed. The start date of the week that the search for the package was executed is listed as a row. At the intersection of every week and criteria a box is shown that indicates whether this search criteria was able to execute successfully (in this case a tick is displayed in the box as shown) or failed to execute (in this case a cross is displayed in the box). The user is able to select a failed to execute box, so that details about the error and resolution status can be viewed. For example, an overlay over the interface is displayed that describes the error including:
- the number of new records located by the criteria at that date
- the number of those records which have not been listed before for this package
- the number of errors that were raised
- the date and action that was made to correct or attempt to correct the error.

Figure 8H:
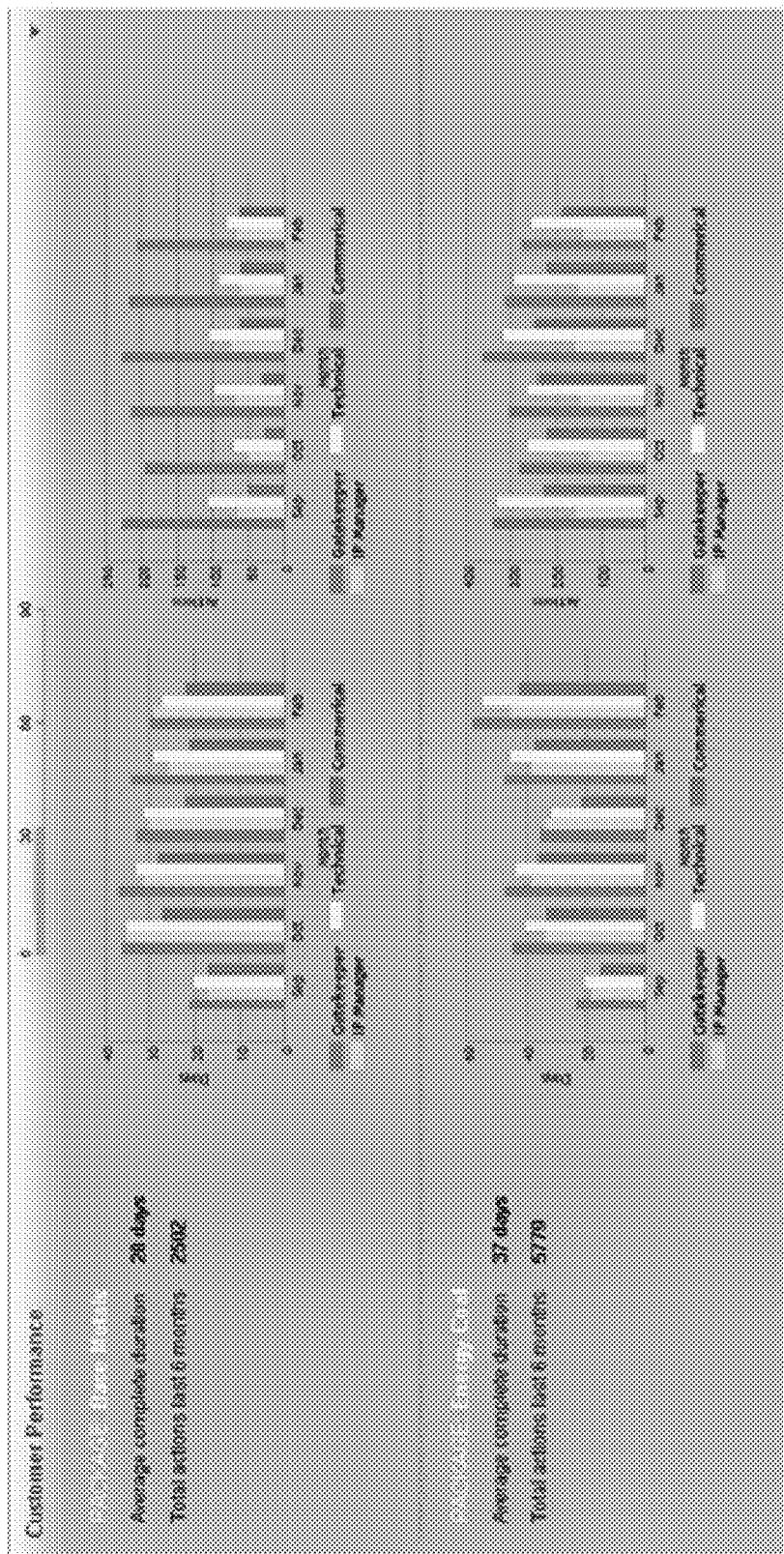
FIG. 8H is a sample screen shot that allows the user to obtain a summary of the timeliness and quantity of reviews for each package of the customer.

Interface of FIG. 8H allows the user to review the overall response times for all users across all packages. The summary includes:
- the number of reviews from users for this package that are outstanding
- the average time between a document being listed in a package and a review being received
- average time to review
- total number of reviews received for this package within the last year
- total number of reviews received for this package overall Graphs are also used to summarise the reviewing performance for this package. A graph shows the average number of days (y axis) taken to review when grouped by month (x axis). Each month is also grouped by role so that the graph displays the average time review to a listing by month and by role. A graph shows the total number of actions (y axis) by month and by role (x axis).

Further or alternative summaries could be based on a specific user only, or combining data from one or more packages, one or more specific users, and/or one or more roles.

Each user has a role type in a particular package. The role types include:
- technical reviewer
- commercial reviewer
- intellectual property reviewer
- gatekeeper (i.e. the administrator)

A user only has access to the documents relating to a package if they have a role in that package.

The role of the user controls what information a user is provided for display on the user interface. For example, a technical reviewer cannot see the reviews entered into the system by a commercial reviewer. Referring to interface of FIG. 6E, if the current user is a technical reviewer they would not be able to see the first posted comment at by a commercial reviewer.

The role of the user also controls what responsibilities they can be delegated. For example, a user that is a commercial reviewer cannot delegate their responsibility to a technical reviewer. Referring to interface of FIG. 8D, that means that if the current reviewer is a commercial reviewer, the names of technical reviewers would not appear on the pick list for selection.

In one example, all the interfaces 120 described above are provided to the client terminal by the webserver 130 and data is stored only in the database 140.

Preferably the data is distributed between the database 140 and 150. In this case all data relating to:
- the users, including their roles and delegations, and their outstanding actions packages, including the search criteria
- the listings, including bibliographic data, publications and translations alerts
- publication requests
- and the relationship between in all these are stored in a relational database on the database 140.

The webserver extracts from the database 140 the appropriate information to display to the user on the interface 120. The information is used to either populate the display with information or to control what functions are available to the user within the interface 121.

All data relating to the reviews themselves, such as the ratings, comments, and attachments is stored on the datastore 150. In this case, application software is installed on the user terminal 110 to display the interface 110. The software application requests information that is provided from both database 140 (via webserver 130) and database 150 for display on the interface 121.

Advantages of the example described here includes:
- helps increase the opportunity for collaboration as it allows users to review and confer on the relevance of a listing
- helps make users accountable by helping to manage the process and easily identify for a user all the outstanding reviews required from them
- since a record of all reviews is made in the database 140, it helps make system auditable by maintaining a history of all the searches and the reviews
- the user friendly interfaces makes it easy to use
- the ability to explore the data in the different ways helps to identify market activity in emerging areas
- the design is scalable so it can be used across entire organisations.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

What is claimed:

1. A computer implemented method for facilitating review of an electronic document, the method comprising the steps of:
   (a) displaying on a user interface information relating to the electronic document and information relating to a particular context that the electronic document is to be reviewed by a user, the electronic document comprising a patent record or specification, a trade mark record or specification, or a design record or specification, wherein the particular context is selectable from a plurality of contexts, the plurality of contexts comprising one or more of a business context for performing a review of the electronic document by the user, a role within the business context that the user is performing the review, and an event that triggers a review of the electronic document by the user, the information on the user interface comprises a visual map of different groups associated with the particular context, the different groups represented by the visual map comprise different business competitors associated with the particular context, each group is represented by an icon that is proportionately sized to represent a number of items within the group in relation to items within other groups represented by the visual map, and the visual map is configured to present additional information about the items represented by an icon as an overlay on the visual map in response to a user selecting the icon, the additional information comprising at least one of a brief description of a commercial operation of the business competitor associated with the icon, a country of origin of the business competitor associated with the icon, and a number of patent properties of the business competitor associated with the icon that have previously been reviewed and indicated as relevant to the electronic document;

(b) enabling the user to enter into the user interface an indication of their review of the electronic document for the particular context; and (c) displaying on the user interface information relating to an another context that the electronic document is to be reviewed or has been reviewed.

2. A computer implemented method according to claim 1, further comprising providing information relating to the review of the electronic document entered by other users for the particular context.

3. A computer implemented method according to claim 2, wherein the other users have a role within the particular context and the step of providing information relating to the review of other users is based upon selectively providing information depending the role of the other users relative to that of the user.

4. A computer implemented method according to claim 1, wherein the indication of their review of step (b) comprises one or more of a text based comment, a rating selected from a list of ratings, a request for another user to review the document, and an attachment.

5. A computer implemented method according to claim 1, wherein the indication of their review of step (b) comprises a rating selected from a list of ratings further comprising the step of committing the review, and triggering one or more review requests depending on the rating selected.

6. A computer-implemented method for facilitating review of electronic documents, the method comprising the steps of:

(a) displaying on a user interface information relating to a role of the user in reviewing the electronic documents, wherein each electronic document comprises a patent record or specification, a trade mark record or specification, or a design record or specification;

(b) enabling the user to enter into the user interface an indication that the role is to be performed by an alternative reviewer, and a first time period that the role is to be performed by the alternative user; and (c) during the first period of time, allowing access to the electronic documents to the alternative user for review and via a display interface associated with the alternative user, wherein allowing access to the electronic documents comprises enabling a display by the user interface associated with the alternative user a visual map of different groups associated with a particular context, the different groups represented by the visual map comprise different business competitors associated with the particular context, the particular context relating to the role within a business context that the user is performing the review, each group is represented by an icon that is proportionately sized to represent a number of items within the group in relation to items within other groups represented by the visual map, and the visual map is configured to present additional information about the items represented by an icon as an overlay on the visual map in response to a user selecting the icon, the additional information comprising at least one of a brief description of a commercial operation of the business competitor associated with the icon, a country of origin of the business competitor associated with the icon, and a number of patent properties of the business competitor associated with the icon that have previously been reviewed and indicated as relevant to the electronic document.

7. A computer-implemented method according to claim 6, further comprising:

displaying on the user interface associated with the alternative user information relating to a role of the alternative user in reviewing the electronic documents;

enabling the alternative user to enter into the user interface associated with the alternative user an indication that the role is to be performed by a further alternative reviewer, and a second time period that the role is to be performed by the further alternative user; and during the second period of time, allowing access to the electronic documents to the further alternative user for review.

8. A computer-implemented method according to claim 6, further comprising:

enabling the user to enter into the user interface an indication that the role is no longer to be performed by the alternative user; and disallowing access to the electronic documents by the alternative user.

9. A computer-implemented method according to claim 6, wherein the role includes all the roles of the user or at least one of the roles of the user.

10. A computer-implemented method according to claim 6, wherein the role includes a specific type of role in a particular context for the review of the electronic documents.

11. A computer-implemented method according to claim 6, further comprising the step of providing a list of the alternative users that are allowed to perform the role of the user, and wherein step (c) further comprises enabling the user to select from the list.

12. A computer implemented method for facilitating review of electronic documents related to one or more contexts, the method comprising the steps of:

(a) displaying on a user interface information relating to an electronic document that is related to a particular context, the electronic document comprising a patent record or specification, a trade mark record or specification, or a design record or specification, wherein the particular context is selectable from a plurality of contexts, the plurality of contexts comprising one or more of a business context for performing a review of the electronic document by the user, a role within the business context that the user is performing the review, and an event that triggers a review of the electronic document by the user, the information on the user interface comprises a visual map of different groups associated with the particular context, the different groups represented by the visual map comprise different business competitors associated with the particular context, each group is represented by an icon that is proportionately sized to represent a number of items within the group in relation to items within other groups represented by the visual map, and the visual map is configured to present additional information about the items represented by an icon as an overlay on the visual map in response to a user selecting the icon, the additional information comprising at least one of a brief description of a commercial operation of the business competitor associated with the icon, a country of origin of the business competitor associated with the icon, and a number of patent properties of the business competitor associated with the icon that have previously been reviewed and indicated as relevant to the electronic document;

(b) enabling a user to enter into the user interface an indication of their review of the electronic document; and (c) enabling the user to enter into the interface a request for the user to receive a notification when a specific event occurs that is associated with the electronic document or any of the electronic documents of the particular context.

13. A computer implemented method according to claim 12, wherein the event relates to one or more jurisdictions.

14. A computer implemented method according to claim 12, wherein the user has a role type, and the request of step (c) is for all users having a particular role type to receive the notification.

15. A computer implemented method according to claim 12, further comprising the step of:

(d) when the specific event does occur, displaying on the user interface an indication that the event has occurred.

16. A computer implemented method according to claim 12, further comprising the step of:

(e) displaying on the user interface a summary of the events that have already occurred.

17. A computer implemented method according to claim 12, wherein the electronic document is related to a patent and the event associated with the patent includes any one or more of national phase entry, acceptance, examination commencing, lapsing, filing of a related continuation application, filing of opposition, filing of request for certification, filing of request for re-examination, payment of renewal, and recording of an assignment.

* * * * *